United States Patent
Fujikawa et al.

(10) Patent No.: US 8,675,283 B2
(45) Date of Patent: Mar. 18, 2014

(54) HEAD-UP DISPLAY APPARATUS, SCREEN MEMBER, MANUFACTURING METHOD THEREOF AND IMAGE PROJECTING METHOD

(75) Inventors: Takayuki Fujikawa, Nagoya (JP); Hiroshi Ando, Nagoya (JP)

(73) Assignee: Denso Corporation, Kariya (JP)

( * ) Notice: Subject to any disclaimer, the term of this patent is extended or adjusted under 35 U.S.C. 154(b) by 54 days.

(21) Appl. No.: 13/593,615

(22) Filed: Aug. 24, 2012

(65) Prior Publication Data
US 2013/0050655 A1 Feb. 28, 2013

(30) Foreign Application Priority Data

Aug. 29, 2011 (JP) .................................. 2011-186334
Jul. 2, 2012 (JP) .................................. 2012-148794

(51) Int. Cl.
*G02B 27/01* (2006.01)
*G02B 5/02* (2006.01)

(52) U.S. Cl.
USPC .......................................................... 359/630

(58) Field of Classification Search
USPC .................................... 359/630, 563; 353/28
See application file for complete search history.

(56) References Cited

U.S. PATENT DOCUMENTS 5,440,428 A * 8/1995 Hegg et al. .................... 359/630
2009/0135374 A1 5/2009 Horiuchi et al.

FOREIGN PATENT DOCUMENTS

JP 7-270711 10/1995
JP 2010-145746 7/2010

OTHER PUBLICATIONS

U.S. Appl. No. 13/593,600, filed Aug. 24, 2012, Takayuki Fujikawa et al.
Office Action issued Oct. 21, 2013 in corresponding KR Application No. 10-2012-93162 (with English translation).

* cited by examiner

*Primary Examiner* — Joseph P Martinez
(74) *Attorney, Agent, or Firm* — Harness, Dickey & Pierce, PLC

(57) ABSTRACT

A screen member diffuses a bundle of rays of light projected from a laser scanner such that the bundle of rays of light is guided to a viewing range. The screen member includes a plurality of optical elements. A surface of each optical element forms a curved surface that diffuses the bundle of rays of light, which enters the curved surface. The optical elements are arranged in a lattice pattern at each corresponding pitch that is set to adjust a peak-to-peak interval of diffracted rays, which are formed in the viewing range by diffraction of the bundles of rays diffused by the plurality of optical elements, to a value that is equal to or smaller than a diameter of a pupil of the viewer.

31 Claims, 21 Drawing Sheets

HEAD-UP DISPLAY APPARATUS, SCREEN MEMBER, MANUFACTURING METHOD THEREOF AND IMAGE PROJECTING METHOD

CROSS REFERENCE TO RELATED APPLICATION

This application is based on and incorporates herein by reference Japanese Patent Application No. 2011-186334 filed on Aug. 29, 2011 and Japanese Patent Application No. 2012-148794 filed on Jul. 2, 2012.

TECHNICAL FIELD

The present disclosure relates to a head-up display apparatus, a screen member of the head-up display apparatus, a manufacturing method of the screen member and an image projecting method.

BACKGROUND

In a previously known head-up display (HUD) apparatus, a bundle of rays of light is diffused by a screen member, and the bundle of rays of light, which is diffused by the screen member, is projected as a display image onto a projection surface of a vehicle (e.g., an automobile) to enable a viewer to see a virtual image of the display image.

A screen member of an HUD apparatus recited in, for example, JP2009-128659A, JP2010-145746A or JPH07-270711A, is an optical member, in which a plurality of micro-optical elements is arranged in a lattice pattern to transmit or reflect a bundle of rays of light that is incident on the respective micro-optical elements. The micro-optical elements are generally referred to as micro-lenses or micro-mirrors. In JP2009-128659A, each micro-optical element is configured into a shape of circle. In JP2010-145746A, each micro-optical element is configured into a shape of hexagon. Furthermore, in JPH07-270711A, each micro-optical element is configured into a shape of quadrangle (rectangle).

In JP2009-128659A, JP2010-145746A or JPH07-270711A, a surface of each of the micro-optical elements is formed as a curved surface to diffuse the bundle of rays of light, which is incident onto the curved surface, at a predetermined angle of diffusion. Therefore, the bundle of rays of light, which is outputted from the optical element at the predetermined angle of diffusion and is projected onto the projection surface, is guided to a predetermined range that is set around eyes of the viewer. At this time, the shape of the bundle of rays diffused by the optical element corresponds to the shape of the optical element, which is defined by the outer edges of the optical element. Thereby, the shape of the predetermined range, into which the bundle of rays is guided, corresponds to the shape of the optical element. Therefore, in this predetermined range, even when an eye point of the viewer is moved, the viewer can still visually recognize the display image. That is, this predetermined range is a viewing range, in which the viewer located in the vehicle can visually recognize the virtual image of the display image.

JPH07-270711A recites that an angle of diffusion of the diffused rays in a widthwise direction of each optical element and an angle of diffusion of the diffused rays in a height direction of the optical element can be individually controlled by changing a width and a height of the optical element.

The inventors of the present application have conducted an experiment by changing the width and the height of each optical element. As a result of this experiment, it has been found that when the width and the height of the optical element have a predetermined relationship, the virtual image of the display image, which is visually recognized by the viewer (occupant of the vehicle), is blurred.

SUMMARY

The present disclosure is made in view of the above disadvantage.

According to the present disclosure, there is provided a head-up display apparatus that is configured to project a display image onto a projection surface of a vehicle and thereby to enable a viewer located in a vehicle cabin of the vehicle to view a virtual image of the display image. The head-up display apparatus includes a projector and a screen member. The projector is configured to project a bundle of rays of light, which forms the display image. The screen member diffuses the bundle of rays of light such that the bundle of rays of light is guided to a viewing range, in which the virtual image is visually recognizable by the viewer in the vehicle cabin. The screen member includes a plurality of optical elements. A surface of each of the plurality of optical elements forms a curved surface that diffuses the bundle of rays of light, which enters the curved surface. The plurality of optical elements is arranged continuously one after another in two or more directions at each corresponding pitch that is set to adjust a peak-to-peak interval of diffracted rays, which are formed in the viewing range by diffraction of the bundles of rays diffused by the plurality of optical elements, to a value that is equal to or smaller than 8 mm. Alternatively, the plurality of optical elements may be arranged continuously one after another in two or more directions at each corresponding pitch that is set to adjust a peak-to-peak interval of diffracted rays, which are formed in the viewing range by diffraction of the bundles of rays diffused by the plurality of optical elements, to a value that is equal to or smaller than a diameter of a pupil of the viewer.

According to the present disclosure, there is also provided a head-up display apparatus that is configured to project a display image onto a projection surface formed in a display member of a vehicle and thereby to enable a viewer located in a vehicle cabin of the vehicle to view a virtual image of the display image. The head-up display apparatus includes a projector and a screen member. The projector is configured to project a bundle of rays of light, which forms the display image. The screen member diffuses the bundle of rays of light such that the bundle of rays of light is guided to a viewing range, in which the virtual image is visually recognizable by the viewer in the vehicle cabin. The viewing range is configured into a shape of quadrangle that is defined by four outer edges. Two of the four outer edges of the viewing range are generally parallel to each other and are opposed to each other in a first opposing direction of the viewing range, which generally coincides with a left-to-right-direction of the vehicle, and the other two of the four outer edges of the viewing range are generally parallel to each other and are opposed to each other in a second opposing direction of the viewing range, which is perpendicular to the first opposing direction of the viewing range and generally coincides with a top-to-bottom direction of the vehicle. The screen member includes a plurality of optical elements, each of which is configured into a shape of quadrangle that is generally homothetic to the shape of quadrangle of the viewing range and is defined by four outer edges. Two of the four outer edges of each optical element, which correspond to the two of the four outer edges of the viewing range, are generally parallel to each other and are opposed to each other in a first opposing direction of the optical element, and the other two of the four outer edges of the optical element, which correspond to the other two of the four outer edges of the viewing range, are generally parallel to each other and are opposed to each other in a second opposing direction of the optical element, which is perpendicular to the first opposing direction of the optical element. A surface of each of the plurality of optical elements forms a curved surface that diffuses the bundle of rays of light, which enters the curved surface, toward the viewing range. The plurality of optical elements is arranged continuously one after another at a first pitch in the first opposing direction of each optical element and a second pitch in the second opposing direction of each optical element. The first pitch satisfies the following equation:

$$P1 \geq \frac{\lambda}{\sin\left(\frac{\varphi p \times \theta s1}{D1}\right)}$$

where:
P1 denotes the first pitch;
$\lambda$ denotes a wavelength of the bundle of rays of light projected from the projector;
$\varphi p$ denotes a diameter of a pupil of the viewer;
D1 denotes a first length of the viewing range measured in the first opposing direction of the viewing range; and
$\theta s1$ denotes a first angle of diffusion of the bundle of rays of light, which is diffused by the optical element over the viewing range throughout the first length of the viewing range measured in the first opposing direction of the viewing range.

The second pitch satisfies the following equation:

$$P2 \geq \frac{\lambda}{\sin\left(\frac{\varphi p \times \theta s2}{D2}\right)}$$

where:
P2 denotes the second pitch;
$\lambda$ denotes the wavelength of the bundle of rays of light projected from the projector;
$\varphi p$ denotes the diameter of the pupil of the viewer;
D2 denotes a second length of the viewing range measured in the second opposing direction of the viewing range; and
$\theta s2$ denotes a second angle of diffusion of the bundle of rays of light that is diffused by the optical element over the viewing range throughout the second length of the viewing range measured in the second opposing direction of the viewing range.

According to the present disclosure, there is also provided a screen member for a head-up display apparatus that is configured to project a display image onto a projection surface of a vehicle and thereby to enable a viewer located in a vehicle cabin of the vehicle to view a virtual image of the display image upon diffusing a bundle of rays of light, which is projected from a projector, by the screen member to guide the bundle of rays of light to a viewing range, in which the virtual image is visually recognizable by the viewer in the vehicle cabin. The screen member includes a plurality of optical elements. A surface of each of the plurality of optical elements forms a curved surface that diffuses the bundle of rays of light, which enters the curved surface. The plurality of optical elements is arranged continuously one after another in two or more directions at each corresponding pitch that is set to adjust a peak-to-peak interval of diffracted rays, which are formed in the viewing range by diffraction of the bundles of rays diffused by the plurality of optical elements, to a value that is equal to or smaller than a diameter of a pupil of the viewer.

According to the present disclosure, there is also provided a manufacturing method of a screen member for a head-up display apparatus that is configured to project a display image onto a projection surface of a vehicle and thereby to enable a viewer located in a vehicle cabin of the vehicle to view a virtual image of the display image upon diffusing a bundle of rays of light, which is projected from a projector, by the screen member to guide the bundle of rays of light to a viewing range, in which the virtual image is visually recognizable by the viewer in the vehicle cabin. In the manufacturing method, each corresponding pitch of a plurality of optical elements of the screen member arranged continuously one after another in two or more directions is determined to set a peak-to-peak interval of diffracted rays, which are formed in the viewing range upon occurrence of diffraction of bundles of rays diffused by the plurality of optical elements, to a value that is equal to or smaller than 8 mm. Thereafter, there is formed the screen member that has the plurality of optical elements, which are arranged continuously one after another in two or more directions at each corresponding pitch that is determined in the determining of each corresponding pitch of the plurality of optical elements.

According to the present disclosure, there is also provided an image projecting method of projecting a display image onto a projection surface of a vehicle to enable a viewer located in a vehicle cabin of the vehicle to view a virtual image of the display image. The image projecting method includes adjusting a peak-to-peak interval of diffracted rays, which are formed in the viewing range, to a value that is equal to or smaller than a diameter of a pupil of the viewer through use of a projector and a screen member. The projector is configured to project a bundle of rays of light, which forms the display image. The screen member diffuses the bundle of rays of light such that the bundle of rays of light is guided to the viewing range, in which the virtual image is visually recognizable by the viewer in the vehicle cabin. The screen member includes a plurality of optical elements. A surface of each of the plurality of optical elements forms a curved surface that diffuses the bundle of rays of light, which enters the curved surface, and the diffracted rays are formed in the viewing range by diffraction of the bundles of rays of light, which are diffused by the plurality of optical elements, respectively. The plurality of optical elements is arranged continuously one after another in two or more directions at each corresponding pitch.

BRIEF DESCRIPTION OF THE DRAWINGS

The drawings described herein are for illustration purposes only and are not intended to limit the scope of the present disclosure in any way.

DETAILED DESCRIPTION

Figure 1:
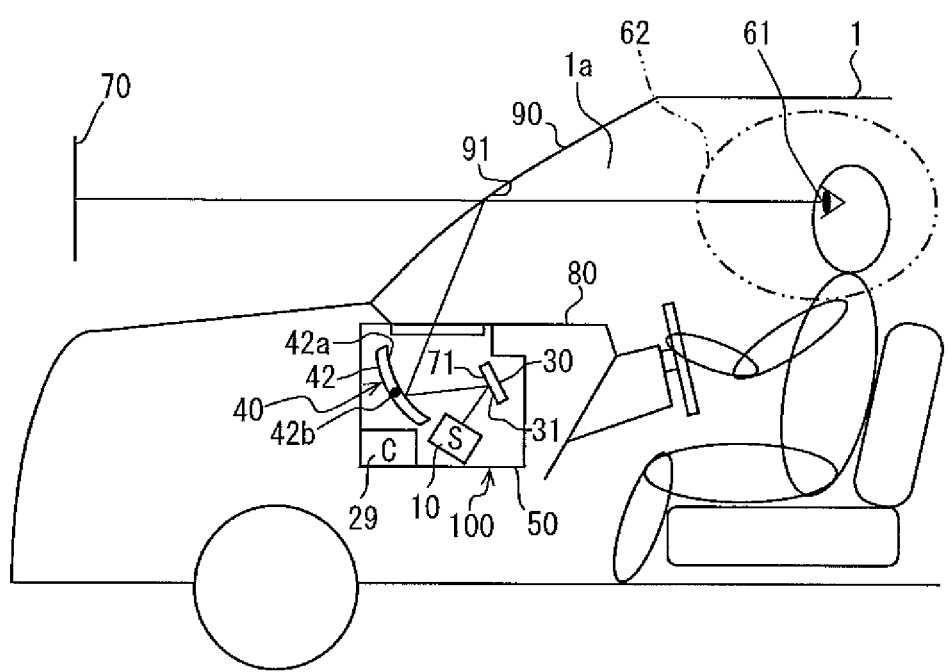
FIG. 1 is a schematic diagram showing a vehicle having a head-up display (HUD) apparatus according to a first embodiment of the present disclosure.

Various embodiments of the present disclosure will be described with reference to the accompanying drawings. In the following description, similar components will be indicated by the same reference numerals throughout the embodiments and modifications thereof and will not be described redundantly for the sake of simplicity. In each of the following embodiments, if only a part of a structure is described, the remaining part is the same as that of the previously described embodiment(s). Furthermore, one or more of the components of any one of the following embodiments and modifications thereof may be combined with any other components of another one or more of the following embodiments and modifications thereof as long as there is no problem with respect to such a combination of the components.

First Embodiment

According to a first embodiment of the present disclosure, as shown in FIG. 1, a head-up display (HUD) apparatus 100 is installed in an instrument panel 80 of a vehicle (e.g., an automobile) 1. The HUD apparatus 100 projects a display image 71 onto a windshield (serving as a display member) 90 of the vehicle 1. A projection surface (also referred to as a surface of projection) 91, onto which the display image 71 is projected from the HUD apparatus 100, is formed in a vehicle interior side surface of the windshield 90. Furthermore, the projection surface 91 is formed as a concave surface, which is concave, i.e., is curved and is recessed in a direction away from a viewer (driver) seated on a driver's seat in a vehicle cabin (passenger compartment) 1a of the vehicle 1 or is formed as a planar surface. Furthermore, the windshield 90 may be a windshield, which has an angular difference between an interior side surface and an exterior side surface to limit a light path difference (optical path difference) therebetween, or may be a windshield, which has a vapor-deposited film or a bonded film on the interior side surface to limit the light path difference.

When a bundle of rays of light, which forms the display image 71, is projected onto the projection surface 91 of the windshield 90, the bundle of rays of light, which is reflected by the projection surface 91, reaches an eye point 61 of the viewer. When the viewer perceives the bundle of rays of light approached to the eye point 61, the viewer can visually recognize the virtual image 70 of the display image 71, which is formed on the front side of the windshield 90 (i.e., the side of the windshield 90, which is opposite from the viewer). At this time, the viewer can recognize the virtual image 70 only when the eye point 61 is located in a viewing range 60 of the viewer shown in FIG. 2. In other words, when the eye point 61 is displaced from the viewing range 60, the viewer may experience a difficulty for the visual recognition of the virtual image 70.

As discussed above, the HUD apparatus 100 projects the display image 71 onto the projection surface 91 to enable the viewer to visually recognize the virtual image 70 of the display image 71 from the inside of the vehicle cabin 1*a* of the vehicle 1. The virtual image 70 of the display image 71 has image segments indicating, for example, a traveling speed display 70*a* of the vehicle 1, a traveling direction sign display 70*b* of the vehicle 1, which is specified by the navigation system, and a warning sign display 70*c* of the vehicle 1.

(Basic Structure)

A basic structure of the HUD apparatus 100, which has the function of displaying the virtual image 70, will now be described in detail. As shown in FIG. 1, the HUD apparatus 100 includes a laser scanner 10, a controller 29, a screen member 30 and an optical system 40, which are received in a housing 50.

Figure 4:
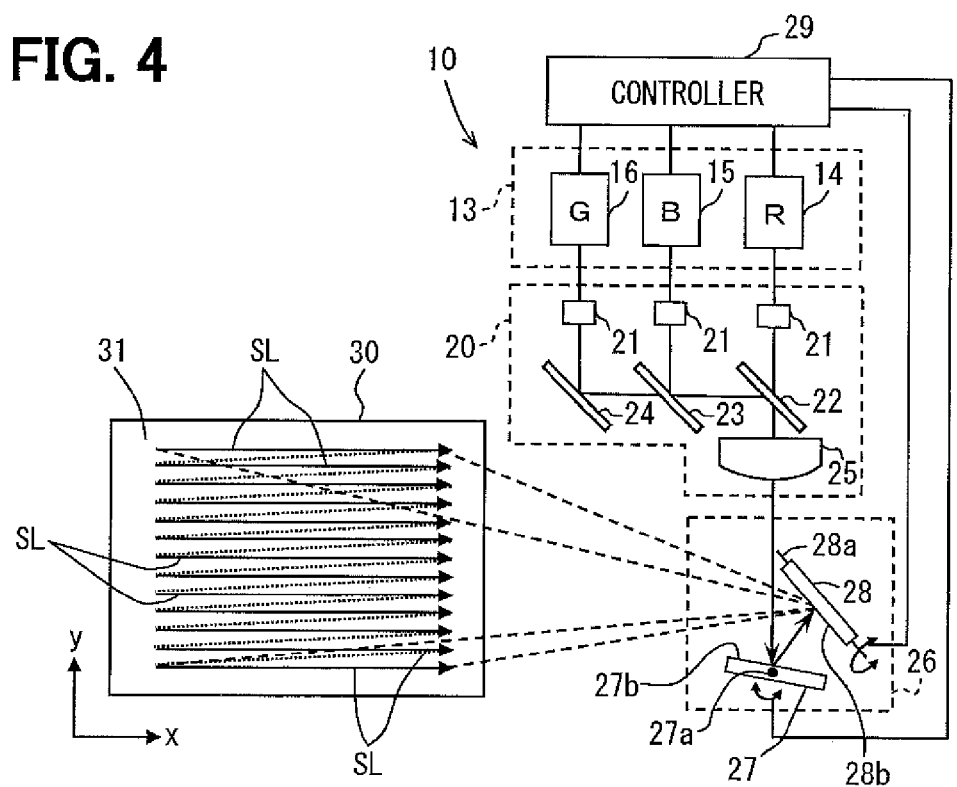
FIG. 4 is a schematic diagram showing a structure of the HUD apparatus according to the first embodiment.

As shown in FIG. 4, the laser scanner 10, which serves as a projector, includes a light source 13, a light guiding arrangement 20 and a micro electro mechanical systems (MEMS) device 26.

The light source 13 includes three laser projecting devices 14-16. Each of the laser projecting devices 14-16 is electrically connected to the controller 29 and has a laser light source, which is, for example, a semiconductor laser (laser diode). Furthermore, each of the laser projecting devices 14-16 projects a corresponding single-wavelength laser light (also referred to as a laser beam) that has a frequency, which is different from that of the other two of the laser projecting devices 14-16. In other words, each of the laser projecting devices 14-16 projects the corresponding laser light that has a color phase, which is different from that of the other two of the laser projecting devices 14-16. Specifically, the laser projecting device 14 projects the laser light of a red color, which has a peak wavelength of, for example, 600 to 650 nm, preferably 640 nm. The laser projecting device 15 projects the laser light of a blue color, which has a peak wavelength of, for example, 430 to 470 nm, preferably 450 nm. The laser projecting device 16 projects the laser light of a green color, which has a peak wavelength of, for example, 490 to 530 nm, preferably 515 nm. When the laser lights of the different color phases, which are respectively projected from the laser projecting devices 14-16, are additively mixed, various colors can be reproduced.

The light guiding arrangement 20 includes three collimator lenses 21, three dichroic filters 22-24 and a condenser lens 25. Each collimator lens 21 is placed on a downstream side of the corresponding laser projecting device 14-16 in the projecting direction of the laser light, which is projected from the laser projecting device 14-16, and each collimator lens 21 is spaced from the corresponding laser projecting device 14-16 by, for example, 0.5 mm. Each collimator lens 21 bends the laser light, which is outputted from the corresponding laser projecting device 14-16, to collimate the laser light, i.e., to generate parallel rays of the laser light.

Each dichroic filter 22-24 is placed on a downstream side of the corresponding collimator lens 21 in the projecting direction of the laser light, which is projected from the corresponding laser projecting device 14-16, and each dichroic filter 22-24 is spaced from the corresponding collimator lens 21 by, for example, 4 mm. Each dichroic filter 22-24 reflects the laser light of a specific wavelength(s), which has passed through the corresponding collimator lens 21, and the dichroic filter 22-24 passes the laser light of the other wavelength(s), which is other than the specific wavelength(s). Specifically, the dichroic filter 22, which is placed on the downstream side of the laser projecting device 14, passes the laser light of the red color and reflects the other laser lights of the other colors that are other than the red color. The dichroic filter 23, which is placed on the downstream side of the laser projecting device 15, reflects the laser light of the blue color and passes the laser lights of the other colors that are other than the blue color. The dichroic filter 24, which is placed on the downstream side of the laser projecting device 16, reflects the laser light of the green color and passes the laser lights of the other colors that are other than the green color.

The dichroic filter 23 is positioned on the downstream side of the dichroic filter 24 in the reflecting direction of the laser light of the green color that is reflected by the dichroic filter 24, and the dichroic filter 23 is spaced from the dichroic filter 24 by, for example, 6 mm. The dichroic filter 22 is positioned on the downstream side of the dichroic filter 23 in the reflecting direction of the laser light of the blue color reflected by the dichroic filter 23, i.e., in the passing direction of the laser light of the green color passed through the dichroic filter 23, and the dichroic filter 22 is spaced from the dichroic filter 23 by, for example, 6 mm. Furthermore, the condenser lens 25 is placed on the downstream side of the dichroic filter 22 in the passing direction of the laser light of the red color passed through the dichroic filter 22, i.e., the reflecting direction of the laser light of the blue color reflected by the dichroic filter 22, and the condenser lens 25 is spaced from the dichroic filter 22 by, for example, 4 mm. Thereby, according to the present embodiment, the laser light of the red color transmitted through the dichroic filter 22, the laser light of the blue color reflected by the dichroic filter 22 after being reflected by the dichroic filter 23 and the laser light of the green color reflected by the dichroic filter 22 after being reflected by the dichroic filters 24 and transmitted through the dichroic filter 23 enter the condenser lens 25 and are mixed.

The condenser lens 25 is a plano-convex lens, which has a light input surface formed as a planar surface and a light output surface formed as a convex surface. The condenser lens 25 converges the laser light by bending the laser light, which enters the light input surface of the condenser lens 25. Thereby, the laser light, which has passed through the condenser lens 25, is projected to the MEMS device 26.

The MEMS device 26 includes a horizontal scanner 27, a vertical scanner 28 and a drive device (not shown). A reflective surface 27*b* is formed as a thin film by, for example, metal vapor deposition of aluminum in a surface of the horizontal scanner 27, a center portion of which is opposed to the condenser lens 25 and is spaced from the condenser lens 25 by, for example, 5 mm. The horizontal scanner 27 is rotatable about a rotatable shaft 27*a*, which extends in the vertical direction in the vehicle 1. Furthermore, a reflective surface 28*b* is formed as a thin film by, for example, metal vapor deposition of aluminum in a surface of the vertical scanner 28, a center portion of which is opposed to the horizontal scanner 27 and is spaced from the horizontal scanner 27 by, for example, 1 mm. The vertical scanner 28 is rotatable about a rotatable shaft 28*a*, which extends in a horizontal direction (a lateral direction, i.e., a left-to-right direction) in the vehicle 1. The drive device of the MEMS device 26 individually rotates the horizontal scanner 27 and the vertical scanner 28 according to a drive signal received from the controller 29, which is electrically connected to the drive device.

A center portion of the vertical scanner 28, which forms a final scanning stage of the laser scanner 10, is spaced from a scanning surface (also referred to as an imaging surface or an arrayed surface) 31 of the screen member 30 by, for example, 100 mm. In the present embodiment, the laser light, which is outputted from the condenser lens 25 and is reflected by the reflective surfaces 27b, 28b of the horizontal and vertical scanners 27, 28, is projected onto the screen member 30 as a bundle of rays of light, which forms the display image 71.

The controller 29 is a control circuit, which includes a processor. The controller 29 outputs the control signal to the respective laser projecting devices 14-16 to intermittently project the laser light as a pulsed light from the laser projecting devices 14-16. Furthermore, the controller 29 outputs the drive signal to the drive device of the MEMS device 26 to sequentially change the projecting direction of the laser light onto the scanning surface 31 in a direction of arrows along scanning lines SL in FIG. 4. As a result, an illuminated area 33 (see FIGS. 5A and 5B), which is illuminated by the laser light as a spot, is moved along the scanning surface 31 to form the display image 71. The display image 71, which is formed on the scanning surface 31, is an image that has, for example, 60 frames per second and 480 pixels in the horizontal direction x and 240 pixels in the vertical direction y.

Figure 5A:
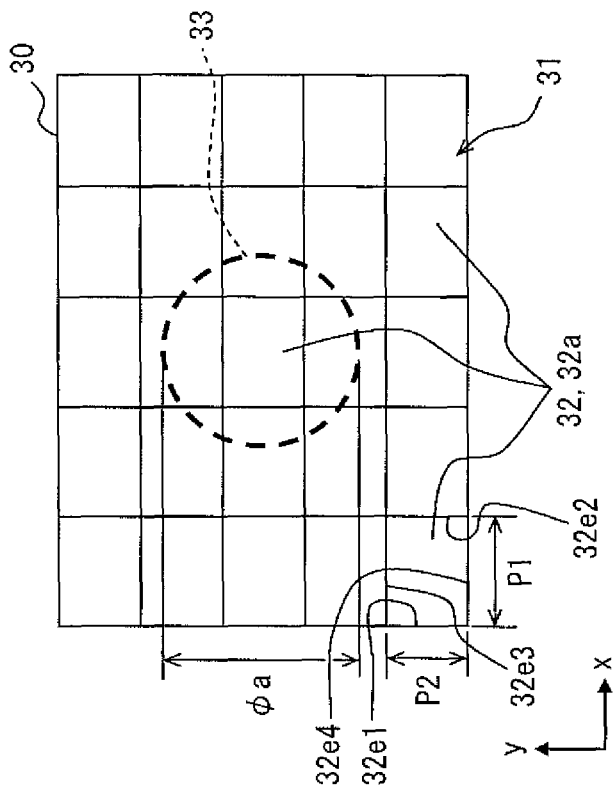
FIG. 5A is a partial front view of a screen member of the HUD apparatus, showing one example of the structure of the screen member according to the first embodiment.
Figure 5B:
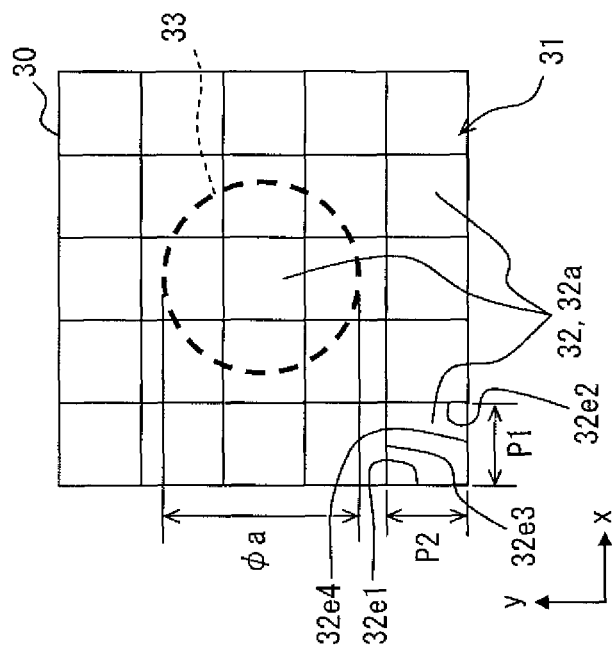
FIG. 5B is a partial front view of the screen member of the HUD apparatus, showing another example of the structure of the screen member according to the first embodiment.
Figure 6:
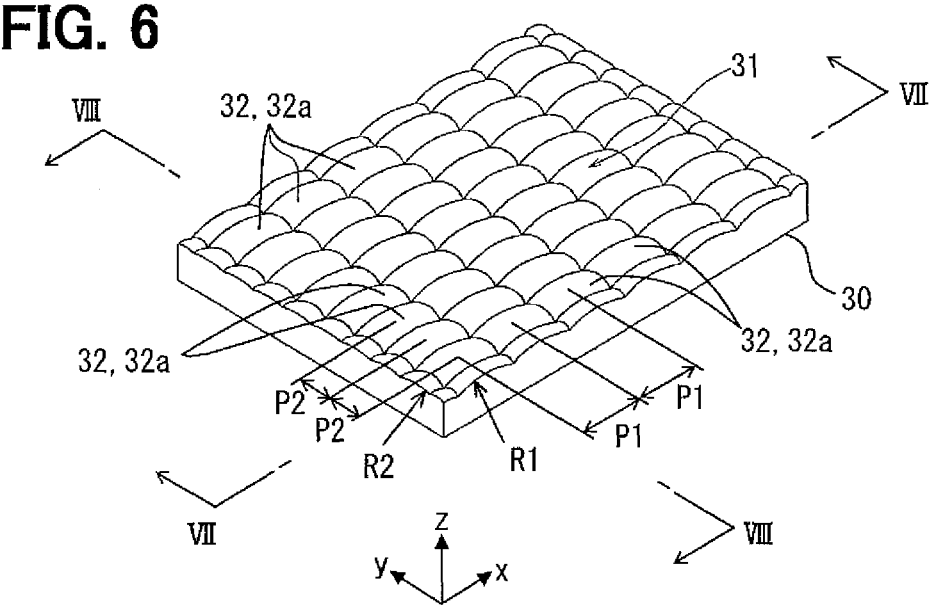
FIG. 6 is a schematic perspective view of the screen member according to the first embodiment.

With reference to FIGS. 5A to 6, the screen member 30 is a reflective screen that is formed by vapor deposition of aluminum on a surface of a resin substrate or a glass substrate. The screen member 30 is placed on the upper side of the laser scanner 10 in a vertical direction (top-to-bottom direction) of the vehicle 1 (see FIGS. 1 and 2). The scanning surface 31 of the screen member 30 is formed as a thin film through metal vapor deposition of aluminum on the surface of the screen member 30. When the laser light is projected as a bundle of rays of light onto the scanning surface 31 from the laser scanner 10, the display image 71 is formed on the scanning surface 31.

The scanning surface 31 includes a plurality of optical elements 32, which are formed as micro-mirrors, respectively, and are arranged in the horizontal direction (also referred to as a lateral direction, a width direction, a first direction, a first opposing direction) x and the vertical direction (also referred to as a top-to-bottom direction, a height direction, a second direction or a second opposing direction) y in a lattice pattern (also referred to as a mesh pattern, a grid pattern). The arrangement of the optical elements 32 in the lattice pattern refers that the optical elements 32 are arranged continuously one after another in two or more directions (in this particular instance, the optical elements 32 being arranged continuously one after another in the horizontal direction x and the vertical direction y, i.e., the optical elements 32 being arranged in rows and columns). In the present embodiment, the optical elements 32 are integrally formed in the screen member 30. Alternatively, the optical elements 32 may be separately formed and may be held integrally on a main body of the screen member 30. Each optical element 32 diffuses the bundle of rays of light upon reflecting the bundle of rays of light, which is projected onto the scanning surface 31. In the present embodiment, in which the optical elements 32 correspond to pixels of the display image 71 in one-to-one relationship, the scanning line SL of FIG. 4 is controlled by the controller 29 such that at least one optical element 32 is located in the illuminated area 33 of FIG. 5A or 5B, onto which the laser light is projected as the spot. A diameter ϕa of the illuminated area 33, onto which the laser light is projected, is set in a range of, for example, 70 to 400 μm in view of the pitches of the optical elements 32 discussed later.

Figure 2:
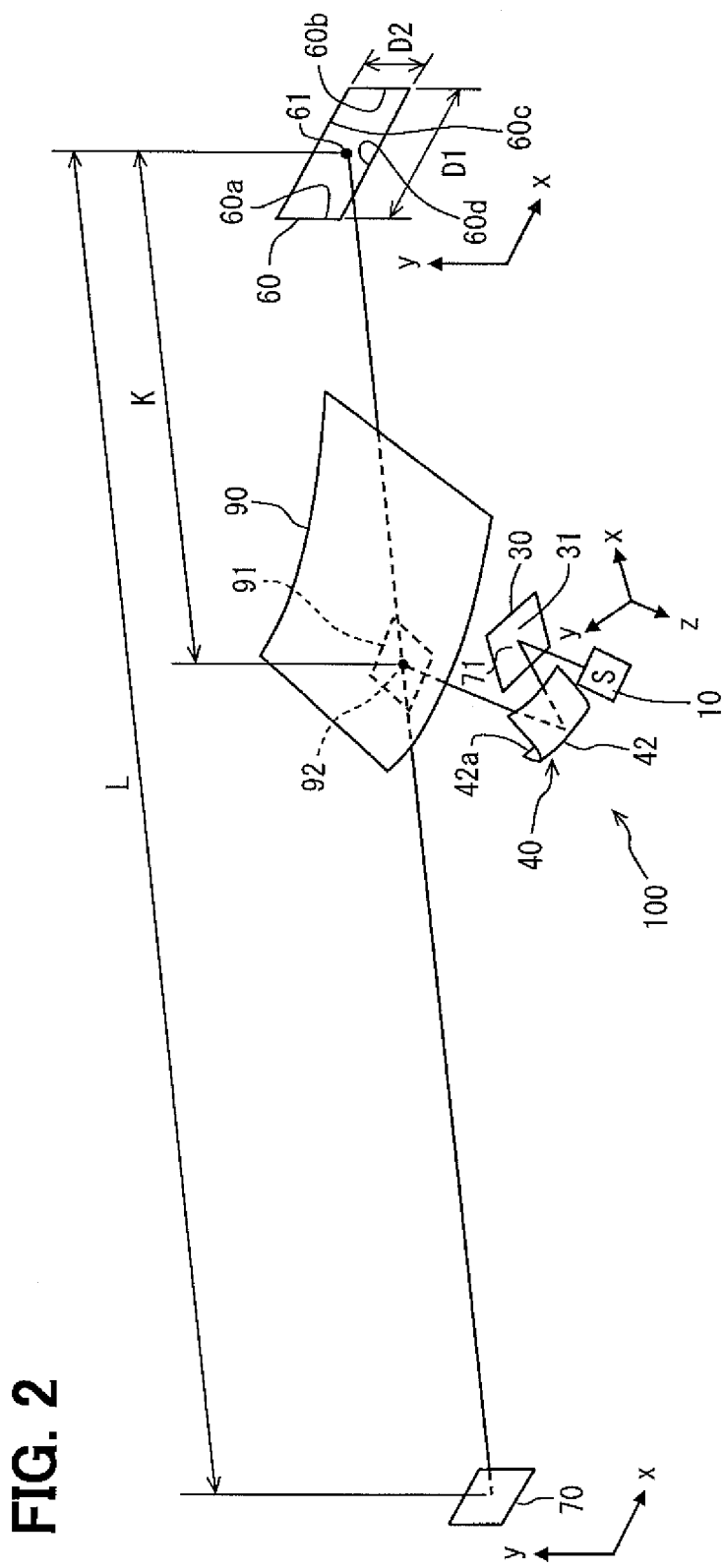
FIG. 2 is a schematic perspective view showing a structure of the HUD apparatus according to the first embodiment.
Figure 3:
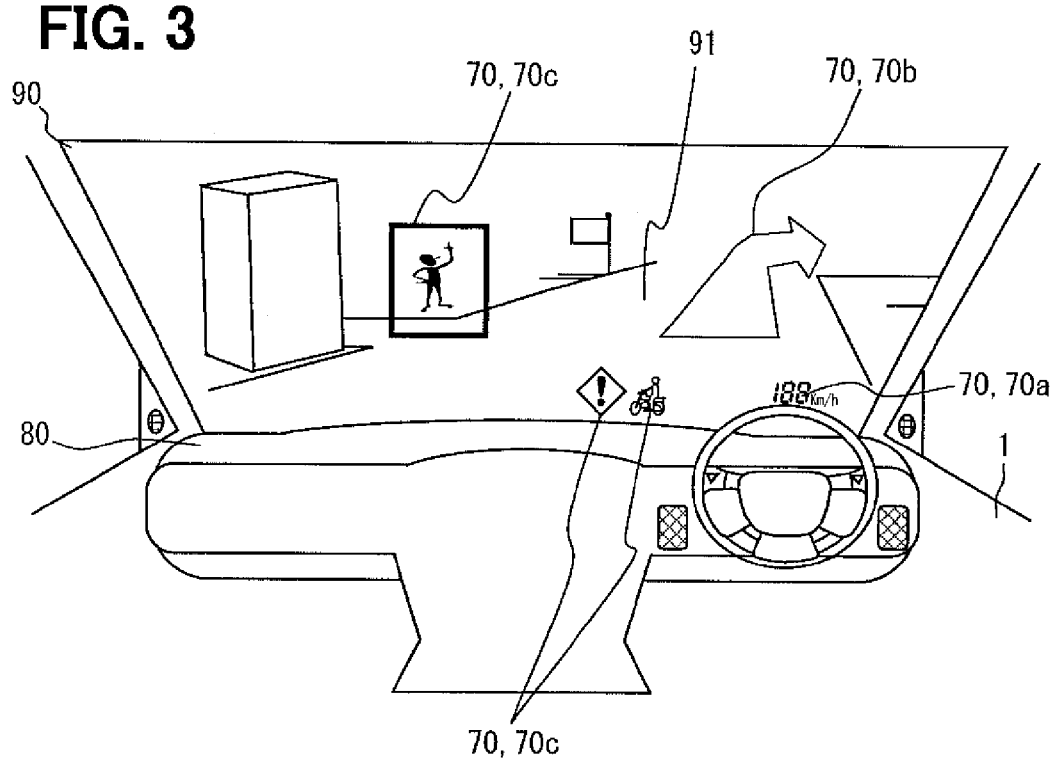
FIG. 3 is a schematic front view showing a display generated by the HUD apparatus according to the first embodiment.

As shown in FIGS. 1 and 2, the optical system 40 includes a concave mirror 42 and a drive device (not shown). The concave mirror 42 is formed through vapor deposition of, for example, aluminum on a surface of a resin substrate or a glass substrate. The concave mirror 42 has a reflective surface 42a that reflects the bundle of rays of light, which is reflected from the respective optical elements 32, to the projection surface 91 of the windshield 90. The reflective surface 42a of the present embodiment is formed as a smooth concave surface, which is curved and is recessed away from the scanning surface 31 and the projection surface 91. The reflective surface 42a enlarges and reflects the bundles of rays of light, which are diffused and reflected by the optical elements 32, respectively, of the scanning surface 31. Furthermore, the reflective surface 42a is swingable about a swing shaft 42b, which is shown in FIG. 1 and extends in the horizontal direction.

The drive device of the optical system 40 swings the concave mirror 42 according to a drive signal received from the controller 29, which is electrically connected to the drive device of the optical system 40. When the concave mirror 42 is swung, an imaging location of the virtual image 70, in which the virtual image 70 is imaged, is moved upward or downward in the vertical direction, and thereby the viewing range 60 of FIG. 2, in which the viewer can view the virtual image 70, is also moved upward or downward in the vertical direction.

(Design Principle)

Next, the design principles of the first embodiment will be described in detail.

Figure 7:
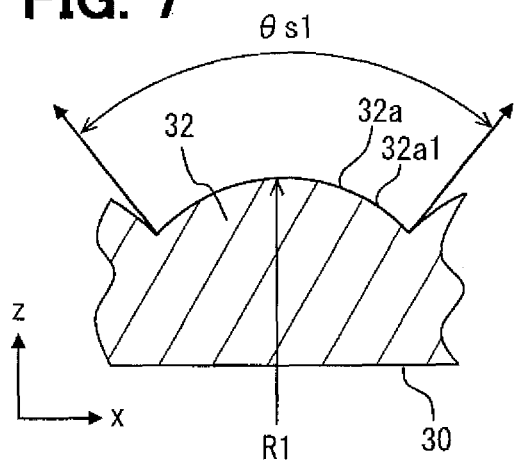
FIG. 7 is a cross-sectional view taken along line VII-VII in FIG. 6.
Figure 8:
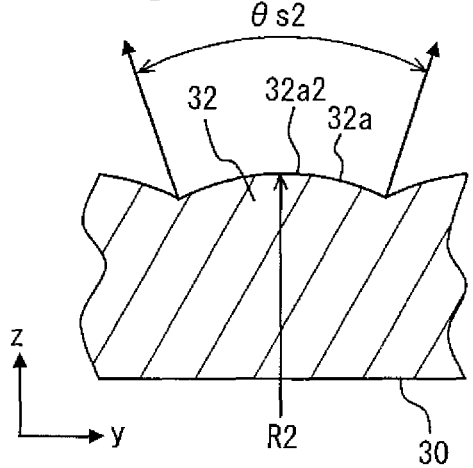
FIG. 8 is a cross-sectional view taken along line VIII-VIII in FIG. 6.

(1) Relationship Between Optical Elements and Viewing Range (1-1) Configuration of Optical Element As shown in FIGS. 6 to 8, each optical element 32 has a curved surface 32a that is configured as a convex surface, which is curved and protrudes toward the laser scanner 10 in the direction z (see FIG. 2) and has an arcuate cross-section or a quadric cross section. Alternatively, the curved surface 32a of each optical element 32 may possibly be formed as a concave surface, which is curved and is recessed away from the laser scanner 10 in the direction z (see FIG. 2) and has an arcuate cross-section or a quadric cross section. As shown in FIG. 7, in a longitudinal cross section of the optical element 32 taken along line VII-VII in FIG. 6 in the horizontal direction x, an arc 32a1 of the curved surface 32a of the optical element 32, which is arcuately curved in the horizontal direction x, has a radius of curvature (first radius of curvature) R1. In other words, the curved surface 32a is arcuately curved in the horizontal direction x to have the radius of curvature R1. Furthermore, as shown in FIG. 8, in a lateral cross section of the optical element 32 taken along line VIII-VIII in FIG. 6 in the vertical direction y, which is perpendicular to the horizontal direction x, an arc 32a2 of the curved surface 32a of the optical element 32, which is arcuately curved in the vertical direction y, has a radius of curvature (second radius of curvature) R2. In other words, the curved surface 32a is arcuately curved in the vertical direction y to have the radius of curvature R2. As shown in FIG. 2, the horizontal direction x of the screen member 30 and of each optical element 32 generally coincides with the horizontal direction (the lateral direction, i.e., the left-to-right direction) of the vehicle 1. Furthermore, the vertical direction y of the screen member 30 and of each optical element 32 is tilted relative to the vertical direction of the vehicle 1 in the present embodiment. Alternatively, the vertical direction y of the screen member 30 and of each optical element 32 may possibly generally coincide with the vertical direction of the vehicle 1.

As shown in FIGS. 5A and 5B, the curved surface 32a of each optical element 32 is configured into a shape of quadrangle (rectangle) having four outer edges 32e1-32e4 in a view taken in the direction z, i.e., a direction perpendicular to a plane of the screen member 30. The quadrangle, which is formed by the outer edges 32e1-32e4 of the curved surface 32a, is a polygon, in which the total number of the outer edges 32e1-32e4 is equal to, i.e., is defined by 2N where N is 2 (integer number), and the total number of directions (opposing directions) x, y, in each of which corresponding parallel two of the outer edges 32e1-32e4 are opposed to each other, is N. In each optical element 32, the two edges 32e1, 32e2 are parallel to each other and are opposed each other in the horizontal direction x, and thereby the horizontal direction x of the screen member 30 (and of the optical element 32 in this instance) may be referred to as an opposing direction (a first opposing direction) of the optical element 32, in which these two parallel edges 32e1, 32e2 are opposed to each other. Also, the other two edges 32e3, 32e4 of the optical element 32 are parallel to each other and are opposed each other in the vertical direction y, and thereby the vertical direction y of the screen member 30 (and of the optical element 32 in this instance) may be referred to as an opposing direction (a second opposing direction) of the optical element 32, in which these two parallel edges 32e3, 32e4 are opposed to each other.

As shown in FIGS. 5A to 6, the optical elements 32 are arranged side-by-side in the lattice pattern (the rectangle lattice pattern in this instance) such that the corresponding outer edges 32e1-32e4 of each adjacent two of the curved surfaces 32a of the optical elements 32 overlap with each other, and the optical elements 32 are arranged one after another in the horizontal direction x at the predetermined pitches P1 and in the vertical direction y at the predetermined pitches P2. As shown in FIG. 5A, the pitch (first pitch) P1 in the horizontal direction x may be set to be the same as, i.e., equal to the pitch (second pitch) P2 in the vertical direction y to configure the curved surface 32a into a shape of square defined by the four outer edges 32e1-32e4 in each optical element 32. Alternatively, as shown in FIG. 5B, the pitch P1 in the horizontal direction x may be set to be different from the pitch P2 in the vertical direction y to configure the curved surface 32a into a shape of elongated quadrangle (oblong quadrangle), more specifically, a shape of elongated rectangle (oblong rectangle) defined by the four outer edges 32e1-32e4 in each optical element 32. In the case of the shape of quadrangle, which is defined by the four outer edges 32e1-32e4 of the optical element 32, as shown in FIGS. 5A and 5B, the pitch P1 may be measured between the corresponding two parallel outer edges 32e1, 32e2, which are parallel to each other and are spaced from each other in the horizontal direction x. In other words, in the present disclosure, the pitch may be defined by the distance between an edge of one optical element and a corresponding edge of next another optical element. Furthermore, the pitch P2 may be measured between the other two parallel edges 32e3, 32e4, which are parallel to each other and are spaced from each other in the vertical direction y. Alternatively, as shown in FIG. 6, the pitch P1 may be measured between centers of each adjacent two optical elements 32, which are adjacent to each other in the horizontal direction x, and the pitch P2 may be measured between centers of each adjacent two optical elements 32, which are adjacent to each other in the vertical direction y.

(1-2) Shape of Viewing Range

Figure 9:
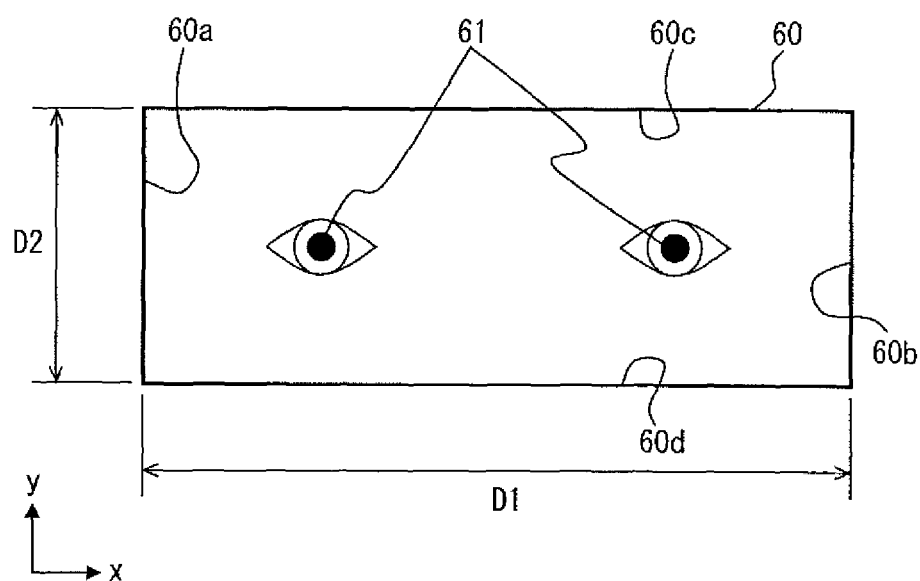
FIG. 9 is a schematic enlarged diagram showing a viewing range according to the first embodiment.

The viewing range 60 is configured to correspond with the shape of each optical element 32. More specifically, the shape of the viewing range 60 is generally homothetic to the shape of each optical element 32. In the present embodiment, as shown in FIGS. 2 and 9, the viewing range 60 is configured into a shape of quadrangle that corresponds to the shape of quadrangle of each optical element 32 (i.e., the shape of quadrangle of the curved surface 32a). The viewing range 60, which is configured into the shape of quadrangle, has a length (first length) D1 in the horizontal direction x and a length (second length) D2 in the vertical direction y. That is, the quadrangle, which is formed by the outer edges 60a-60d of the viewing range 60, is a polygon, in which the total number of the outer edges 60a-60d is defined by 2N where N is 2 (integer number), and the total number of directions (opposing directions) x, y, in each of which corresponding parallel two of the outer edges 60a-60d are opposed to each other, is N. The horizontal direction x of the viewing range 60 generally coincides with the horizontal direction (the lateral direction, i.e., the left-to-right direction) of the vehicle 1, and the vertical direction y of the viewing range 60 generally coincides with the vertical direction (the top-to-bottom direction) of the vehicle 1. In the viewing range 60, the two edges 60a, 60b are parallel to each other and are opposed each other in the horizontal direction x, and thereby the horizontal direction x of the viewing range 60 may be referred to as an opposing direction (a first opposing direction) of the viewing range 60, in which these two parallel edges 60a, 60b are opposed to each other. Also, the other two edges 60c, 60d of the viewing range 60 are parallel to each other and are opposed each other in the vertical direction y, and thereby the vertical direction y of the viewing range 60 may be referred to as an opposing direction (a second opposing direction) of the viewing range 60, in which these two parallel edges 60c, 60d are opposed to each other.

In the present embodiment, as shown in FIG. 9, the viewing range 60 forms an eye box range (elongated rectangular range), which is elongated in the horizontal direction x and is most suitable for viewing of the virtual image 70 with the eye points 61 of two eyes (left and right eyes) of the viewer. This eye box range, i.e., the elongated rectangular range has the length D1, which is measured in the horizontal direction x and is larger than the length D2 that is measured in the vertical direction y. For instance, the length D1 measured in the horizontal direction x is set to be in a range of 80 to 200 mm and is preferably set to be 130 mm. Furthermore, the length D2 measured in the vertical direction y is set to be in a range of 30 to 200 mm and is preferably set to be 50 mm.

In the present embodiment, the location of the viewing range 60 is defined in view of an eyellipse 62 of FIG. 1. The word "eyellipse" is contraction of two words "eye" and "ellipse" and is defined in, for example, the Japanese Industrial Standard (JIS) or the Society of Automotive Engineers (SAE) standard. In this instance, the eyellipse 62 is a spatial range, in which the eye pints 61 of the viewer (predetermined viewer) seated on the driver's seat of the vehicle can be located in the vehicle cabin 1a of the vehicle 1. The viewing range 60, which is swingable upward or downward in the vertical direction in response to the swing movement of the concave mirror 42, is set to be at least partially located in the range of the eyellipse 62 even upon movement of the viewing range 60 within the swingable range of the viewing range 60. That is, the viewing range 60 is set to enable the viewer to see the virtual image 70 in the viewing range 60 at any location within the swingable range of the viewing range 60. Thereby, as shown in FIG. 2, the viewing range 60 can be measured at a location, which is spaced by a distance K (the distance K being in a range of, for example, 500 to 1000 mm) from a point of reflection 92 of the bundle of rays of light (the point of reflection 92 being located along the central optical axis of the bundle of rays of light) that is projected from the HUD apparatus 100 onto the projection surface 91 and is reflected at the point of reflection 92 in the projection surface 91 toward the viewing range 60. Also, the above location, at which the viewing range 60 can be measured, is spaced by a distance L (the distance L being in a range of, for example, 1000 to 3000 mm) from the virtual image 70.

Figure 10B:
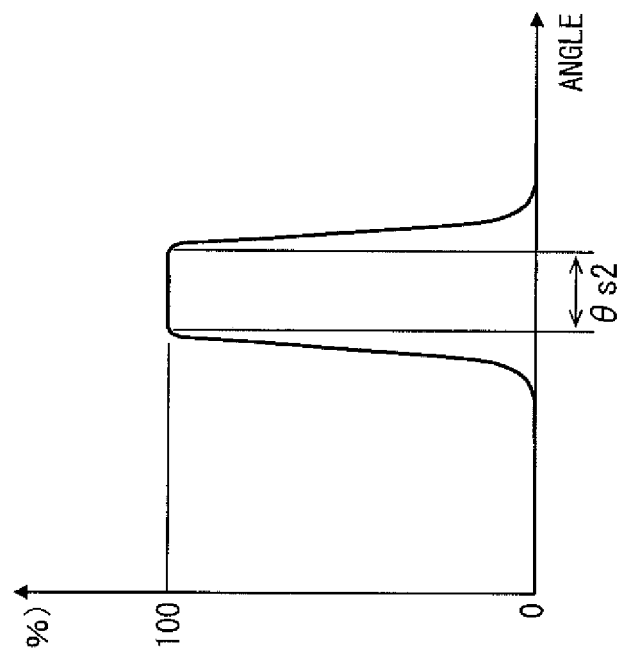
FIG. 10B is a diagram showing a relationship between an angle of diffusion of rays at the optical element of the screen member of the first embodiment along a vertical direction and a reflection light intensity of the rays at the optical element in the one exemplary case.
Figure 10A:
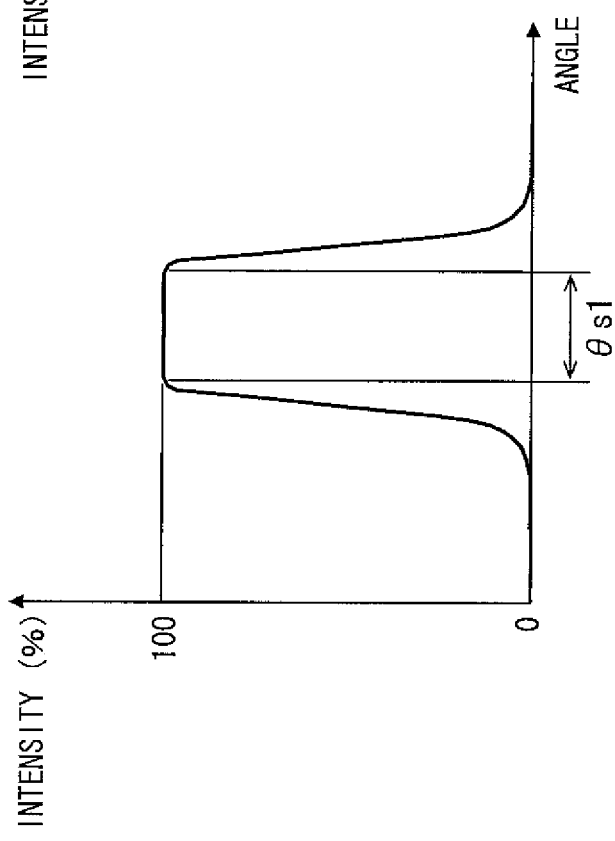
FIG. 10A is a diagram showing a relationship between an angle of diffusion of rays at an optical element of the screen member of the first embodiment along a horizontal direction and a reflection light intensity of the rays at the optical element in one exemplary case.
Figure 11A:
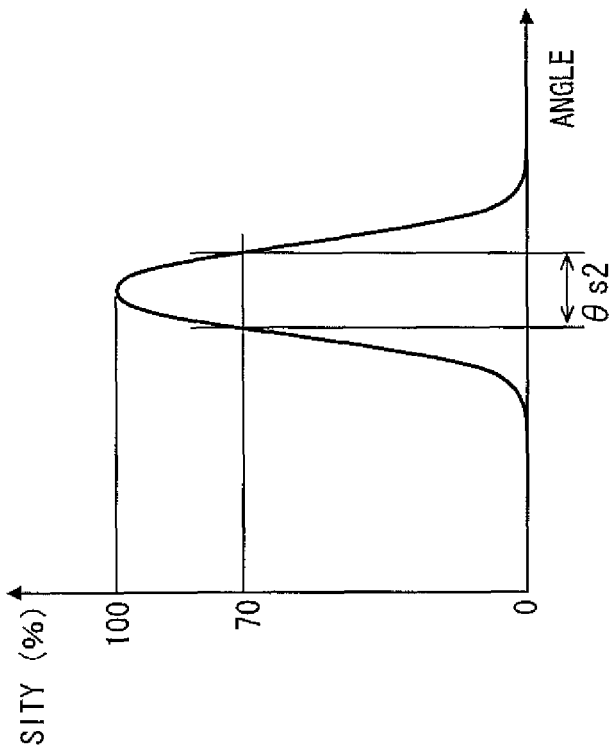
FIG. 11A is a diagram showing a relationship between an angle of diffusion of rays at an optical element of the screen member of the first embodiment along a horizontal direction and a reflection light intensity of the rays at the optical element in another exemplary case.
Figure 11B:
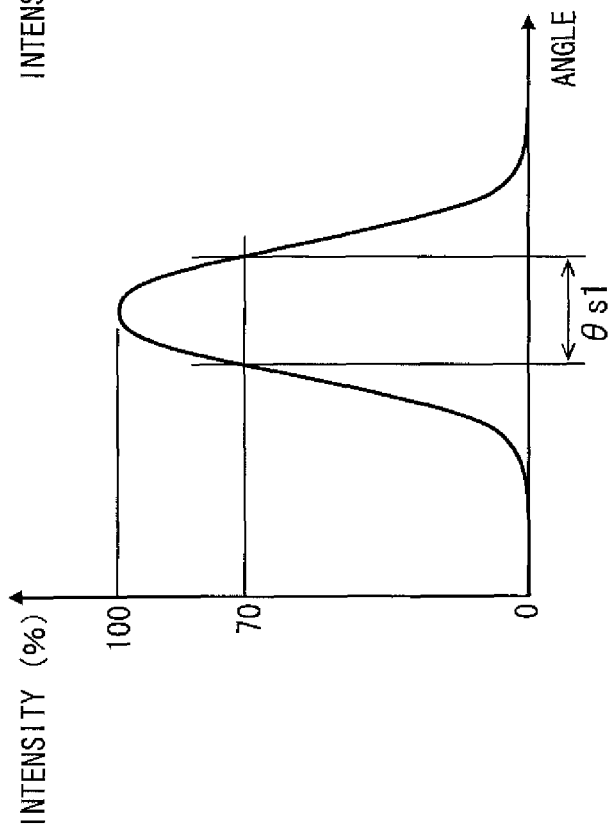
FIG. 11B is a diagram showing a relationship between an angle of diffusion of rays at the optical element of the screen member of the first embodiment along a vertical direction and a reflection light intensity of the rays at the optical element in the another exemplary case.

(1-3) Relationship Between Angle of Diffusion at Optical Element and Viewing Range As shown in FIGS. 7 and 8, each optical element 32 is configured to reflect the bundle of rays of light projected from the laser scanner 10 and thereby to diffuse the bundle of rays of light in a corresponding angular range, i.e., at an angle of diffusion (first angle of diffusion) θs1 in the horizontal direction x and at an angle of diffusion (second angle of diffusion) θs2 in the vertical direction y. In a case where the light intensity of the bundle of rays of light, which is outputted from the laser scanner 10, is made substantially constant throughout the cross section of the bundle of rays of light by the beam shaping, the angular range, in which the light intensity of the reflected rays of light reflected from the optical element 32 is substantially constant, is defined to have the angle of diffusion θs1 in the horizontal direction x and the angle of diffusion θs2 in the vertical direction y, as indicated in FIGS. 10A and 10B. Alternatively, in a case where the distribution of the light intensity of the bundle of rays of light, which is outputted from the laser scanner 10, forms the Gaussian distribution, in order to limit the occurrence of the brightness variation in the viewing range 60, the angular range, in which the light intensity of the reflected rays of light reflected from the optical element 32 is, for example, 70% or higher, is defined to have the angle of diffusion θs1 in the horizontal direction x and the angle of diffusion θs2 in the vertical direction y, as indicated in FIGS. 11A and 11B.

Figure 12:
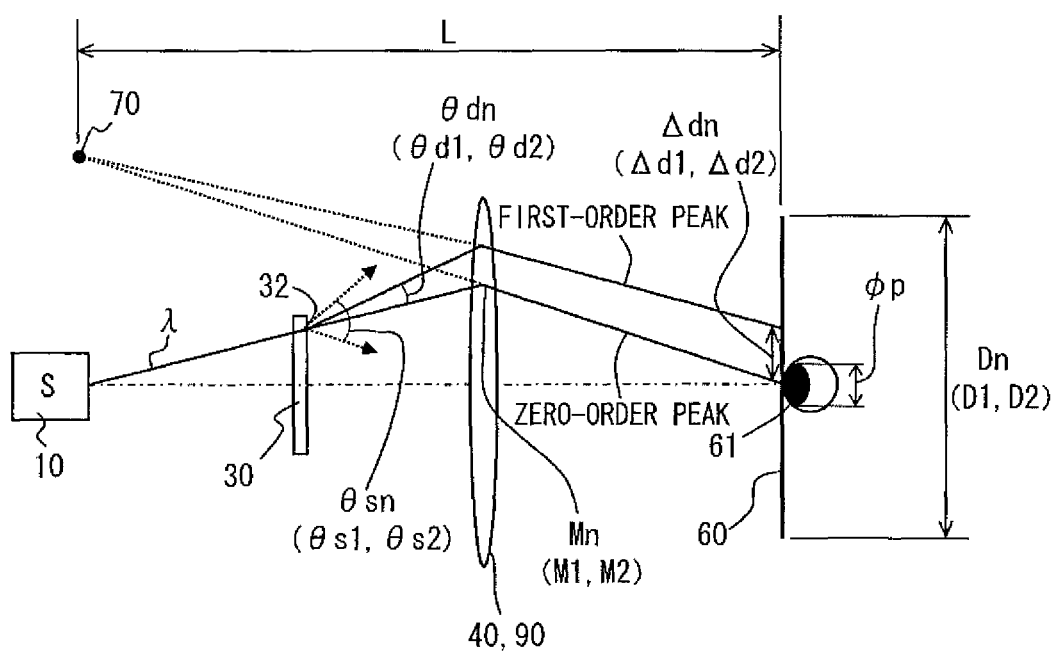
FIG. 12 is a schematic diagram for describing design principles according the first embodiment.

As shown in FIG. 12, which is provided only for the illustrative purpose, the bundle of rays of light, which is diffused by the corresponding optical element 32 at the angle of diffusion θs1 and the angle of diffusion θs2, is sequentially reflected by the optical system 40 (the concave mirror 42) and the windshield 90 and is then projected to the viewing range 60. At this time, the optical system 40 alone or in cooperation with the windshield 90 enlarges the bundle of rays of light, which is diffused by the optical element 32 (in the case of FIG. 12, the optical system 40 being cooperating with the windshield 90). Thereby, according to the present embodiment, the angle of diffusion θs1 in the horizontal direction x and the angle of diffusion θs2 in the vertical direction y are adjusted such that the bundle of rays of light, which is diffused by the corresponding optical element 32, is projected to the entire range of the viewing range 60, i.e., is diffused throughout the viewing range 60 even after the enlargement of the bundle of rays of light, which is diffused by the optical element 32.

Specifically, when a magnification power (an enlargement ratio) of the bundle of rays of light, which is implemented by the optical system 40 alone or in cooperation with the windshield 90 in the horizontal direction x, is denoted as M1, the length D1 of the viewing range 60 measured in the horizontal direction x is expressed by an equation of $2 \times L \times \tan(\theta s1/2)/M1$. Similarly, when a magnification power (an enlargement ratio) of the bundle of rays of light, which is implemented by the optical system 40 alone or in cooperation with the windshield 90 in the vertical direction y, is denoted as M2, the length D2 of the viewing range 60 measured in the vertical direction y is expressed by an equation of $2 \times L \times \tan(\theta s/2)/M2$. In each of the above two equations, the value of L/M1 and the value of L/M2 are fixed values, which correspond to, for example, the specification of the vehicle 1. Therefore, when the angle of diffusion θs1 and the angle of diffusion θs2 are adjusted to satisfy the above two equations, the bundle of diffused rays of light, which is diffused by the corresponding optical element 32, can be projected over, i.e., can be diffused over the entire range of the viewing range 60.

The value of the angle of diffusion θs1 is adjusted in a range of 10 to 50 degrees, desirably 30 degrees to project the bundle of rays of light, which is diffused by the corresponding optical element 32, over the viewing range 60 throughout the length D1 measured in the horizontal direction x. The value of the angle of diffusion θs2 is adjusted in a range of 5 to 50 degrees, desirably 10 degrees to project the bundle of rays of light, which is diffused by the corresponding optical element 32, over the viewing range 60 throughout the length D2 measured in the vertical direction y.

(2) Pitch Setting (2-1) Lower Limit Values of Pitches

Each of the optical elements 32 diffuses the bundle of rays of light, which is projected onto the optical element 32, so that diffraction of the bundles of diffused rays of light, which are diffused by the optical elements 32, occurs, as shown in FIG. 12. In the viewing range 60, the diffraction rays (e.g., a zero-order diffraction peak also simply referred to as a zero-order peak, a first-order diffraction peak also simply referred to as a first order peak) generated by the diffraction of the bundles of rays of light are viewable. Thus, under this circumstance, the virtual image 70 of the display image 71 may possibly be blurred.

As a result of the extensive study conducted by the inventors of the present application, it is found that the phenomenon of blurring of the image becomes prominent when a peak-to-peak interval of the diffracted rays (i.e., an interval between adjacent diffraction peaks of the diffracted rays), which enter the viewing range 60, becomes equal to or larger than a predetermined value. Furthermore, the reason why the blurring of the image becomes prominent upon reaching of the peak-to-peak interval of the diffracted rays equal to or larger than the predetermined value is found by the inventors as follows. Specifically, this is due to a change in the brightness of the virtual image 70 at a pupil of the eye of the viewer caused by presence or absence of the diffraction peak (having the peak value) of the diffracted rays in the pupil of the viewer, and the above predetermined value is a diameter of the pupil of the viewer. The above principle of setting the lower limit values of the pitches P1, P2 of the optical elements 32 will be described with reference to the zero-order diffraction peak and the first-order diffraction peak of the diffracted rays among the various order diffraction peaks of the diffracted rays.

As shown in FIG. 12, when the bundles of rays of light outputted from the laser scanner 10 are incident on the optical elements 32 and are diffused by the optical elements 32, the zero-order diffraction peak of the diffracted rays and the first-order diffraction peak of the diffracted rays are guided to the viewing range 60. At that time, the zero-order diffraction peak of the diffracted rays is guided along the central optical axis, and the first-order diffraction peak of the diffracted rays is deviated from the zero-order diffraction peak of the diffracted rays by an angle of diffraction θd1 in the horizontal direction x and an angle of diffraction θd2 in the vertical direction y. At this time, the angle of diffraction θdn (n=1, 2) between the zero-order diffraction peak and the first-order diffraction peak in each of the horizontal direction x and the vertical direction y (i.e., each of the angle of diffraction θd1 in the horizontal direction x and the angle of diffraction θd2 in the vertical direction y) is expressed by an inverse sine function having an argument that is a ratio between a wavelength λ of the bundle of rays of light, which is incident on the optical element, and the pitch Pn (n=1, 2). That is, the angle of diffraction θdn (n=1, 2) is expressed by $\sin^{-1}(\lambda/Pn)$. Here, it should be noted that each of the angle of diffraction θd1 in the horizontal direction x and the angle of diffraction θd2 in the vertical direction y is expressed by the angle of diffraction θdn (here, "n" being the integer number 1 or 2 in this instance), and each of the pitch P1 in the horizontal direction x and the pitch P2 in the vertical direction y is expressed by the pitch Pn (here, "n" being the integer number 1 or 2 in this instance), for the sake of simplicity. In the present embodiment, the multiple colors of the laser lights form the bundle of rays of light, which is incident on the optical element 32, and thereby a maximum wavelength, i.e., 600 to 650 nm, preferably 640 nm among the peak wavelengths of the multiple colors of the laser lights is preset as the wavelength λ of the bundle of rays of light discussed above.

Furthermore, as shown in FIG. 12, the zero-order diffraction peak and the first-order diffraction peak of the diffracted rays, which are formed by the diffraction of the bundles of rays diffused by the optical elements 32, are projected into the viewing range 60 while having a peak-to-peak interval Δd1 of the diffracted rays between the zero-order diffraction peak and the first-order diffraction peak in the horizontal direction x and a peak-to-peak interval Δd2 of the diffracted rays between the zero-order diffraction peak and the first-order diffraction peak in the vertical direction y. At this time, each corresponding angle of diffusion θsn (n=1, 2) of the optical element 32 in the corresponding one of the horizontal direction x and the vertical direction y is adjusted such that the bundle of rays of light, which is diffused by the optical element 32, is projected to the viewing range 60 throughout each corresponding length Dn (n=1, 2) of the viewing range 60. Therefore, each corresponding peak-to-peak interval Δdn (n=1, 2) of the diffracted rays can be expressed by the equation of Dn×θdn/θsn. With respect to each corresponding peak-to-peak interval Δdn (n=1, 2) of the diffracted rays, which can be expressed by the equation of 2×L×tan(θdn/2)/Mn, since the value of L/Mn is the fixed value as discussed above, each corresponding peak-to-peak interval Δdn (n=1, 2) of the diffracted rays is the physical quantity (physical value), which does not depend on the distance L but depends on the corresponding angle of diffraction θdn (i.e., the corresponding one of the angles of diffractions θd1, θd2).

Figure 13A:
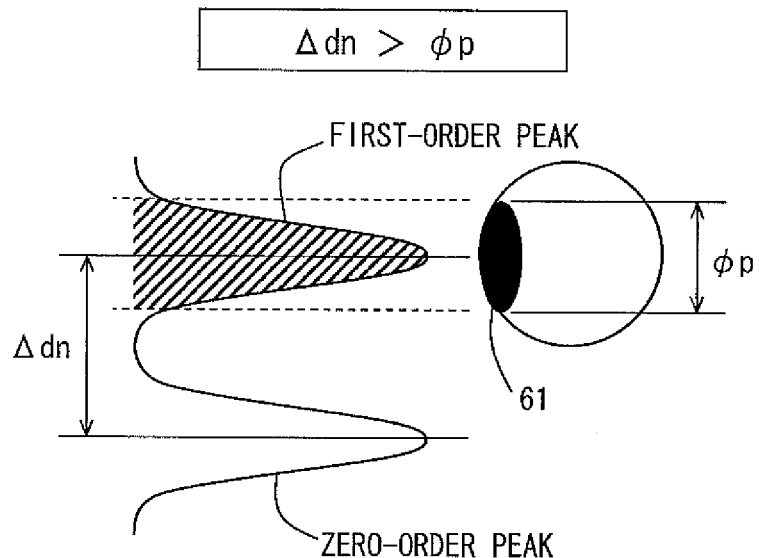
FIGS. 13A and 13B are schematic diagrams for describing a disadvantage in a comparative example.
Figure 13B:
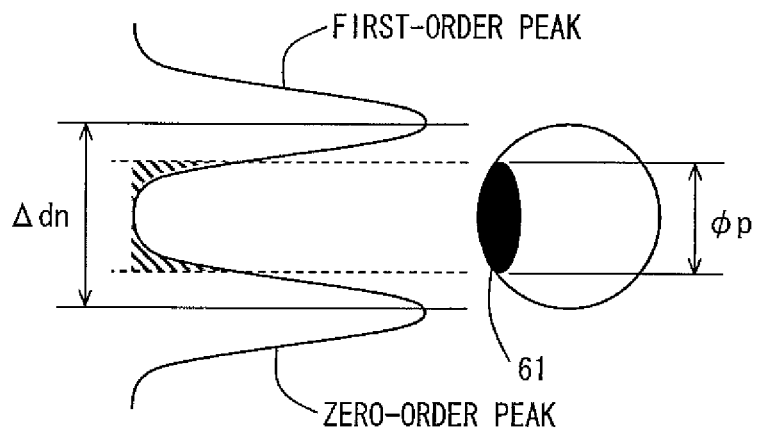

Furthermore, as shown in FIGS. 13A to 14B, the light intensity (the brightness) of the zero-order diffraction peak and the light intensity (the brightness) of the first-order diffraction peak of the diffracted rays, which are projected into the viewing range 60, are larger than the light intensity (the brightness) between the zero-order diffraction peak and the first-order diffraction peak. That is, the light intensity (the brightness) of the zero-order diffraction peak and the light intensity (the brightness) of the first-order diffraction peak of the diffracted rays, which are projected into the viewing range 60, are larger than the light intensity of the trough (minimum) between the zero-order diffraction peak and the first-order diffraction peak. Therefore, in the case where each corresponding peak-to-peak interval Δdn (i.e., each of the peak-to-peak intervals Δd1, Δd2) of the diffracted rays between the zero-order diffraction peak (having the peak value) and the first-order diffraction peak (having the peak value) is larger than the diameter φp of the pupil of the eye of the viewer, as shown in FIG. 13A, when the zero-order diffraction peak (having the peak value) or the first-order diffraction peak (having the peak value) is placed in the center of the pupil of the viewer, the quantity of the incident light (see a shaded area in FIG. 13A) becomes relatively high, and thereby the brightness, which is sensed by the viewer, becomes relatively high. Furthermore, in the case where each corresponding peak-to-peak interval Δdn (i.e., each of the peak-to-peak intervals Δd1, Δd2) of the diffracted rays between the zero-order diffraction peak and the first-order diffraction peak is larger than the diameter φp of the pupil of the eye of the viewer, as shown in FIG. 13B, when the zero-order diffraction peak (having the peak value) or the first-order diffraction peak (having the peak value) is not placed in the center of the pupil of the viewer, the quantity of the incident light (see a shaded area in FIG. 13B) becomes relatively low, and thereby the brightness, which is senses by the viewer, becomes relatively low (dark). Therefore, at this time, the viewer may possibly perceive that the virtual image 70, which is viewed through the viewing range 60, is blurred.

Figure 14A:
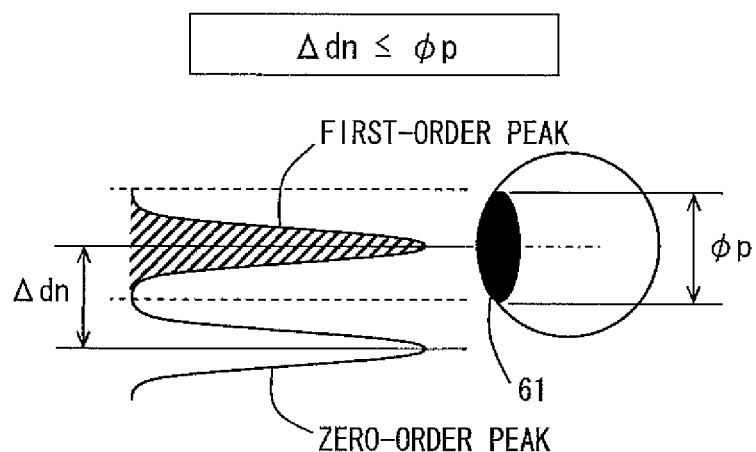
FIGS. 14A and 14B are schematic diagrams for describing a characteristic feature of the first embodiment.
Figure 14B:
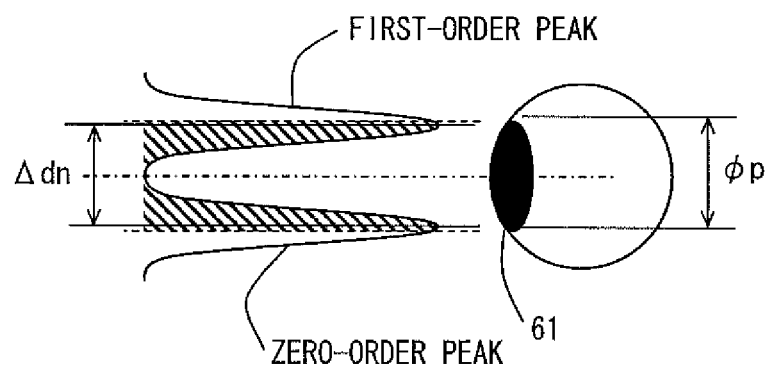

In contrast, in the case where each corresponding peak-to-peak interval Δdn (i.e., each of the peak-to-peak intervals Δd1, Δd2) of the diffracted rays between the zero-order diffraction peak and the first-order diffraction peak becomes equal to or smaller than the diameter φp of the pupil of the eye of the viewer, as shown in FIG. 14A, when the zero-order diffraction peak or the first-order diffraction peak enters, i.e., is placed in the pupil of the viewer, the quantity of the incident light becomes relatively high (see a shaded area in FIG. 14A), and thereby the brightness, which is senses by the viewer, becomes relatively high. Furthermore, in the case where each corresponding peak-to-peak interval Δdn (i.e., each of the peak-to-peak intervals Δd1, Δd2) of the diffracted rays between the zero-order diffraction peak and the first-order diffraction peak is equal to or smaller than the diameter φp of the pupil of the viewer, as shown in FIG. 14B, when the trough (the minimum) between the zero-order diffraction peak and the first-order diffraction peak is centered in the pupil of the viewer, the quantity of the incident light (see the shaded area shown in FIG. 14B), which enters the pupil of the viewer, is substantially the same as or close to the quantity of the incident light (see the shaded area in FIG. 14A), which enters the pupil of the viewer in the case where one of the zero-order diffraction peak and the first-order diffraction peak is placed in the center of the pupil of the viewer. Therefore, the brightness, which is sensed by the viewer, is relatively high. Thus, even when the eye point 61 is placed in the zero-order diffraction peak, the first-order diffraction peak or the area (the trough) between the zero-order diffraction peak and the first-order peak, the variation in the brightness, which is sensed by the viewer, is reduced or limited. Therefore, it is possible to limit the incidence of that the viewer perceives the blurring of the virtual image 70.

In view of the above point, according to the present embodiment, each corresponding pitch Pn (i.e., each of the pitches P1, P2) of each optical element 32 is set in the corresponding one of the horizontal direction x and the vertical direction y, such that each peak-to-peak interval Δdn (i.e., each of the peak-to-peak intervals Δd1, Δd2) becomes equal to or smaller than the diameter φp of the pupil of the viewer, as shown in FIGS. 14A and 14B, so that the blurring of the virtual image 70 is limited. Specifically, each corresponding pitch Pn (i.e., each of the pitches P1, P2) is set to satisfy the following equation 1 to make each corresponding peak-to-peak interval Δdn (i.e., each of the peak-to-peak intervals Δd1, Δd2) equal to or smaller than the diameter φp of the pupil of the viewer while each corresponding peak-to-peak interval Δdn (i.e., each of the peak-to-peak intervals Δd1, Δd2) is obtained by applying the corresponding angle of diffraction θn (i.e., the corresponding one of the angles of diffraction θd1, θd2), which is expressed by the inverse sine function discussed above, in the equation of Dn×θdn/θsn discussed above.

$$Pn \geq \frac{\lambda}{\sin\left(\frac{\varphi p \times \theta sn}{Dn}\right)} \qquad \text{Equation 1}$$

The diameter φp of the pupil is preset to a diameter of the pupil, which is measured under a predetermined condition where the luminous energy around pupil is about 10,000 lux at the time of entering the sunlight into the vehicle cabin 1a of the vehicle 1 during the daytime (see "DeJong's The Neurologic Examination" authored by William Wesley Campbell, Russell N. DeJong, Armin F. Haerer, and published by Lippincott Williams & Wilkins, 2005). According to the above identified book of "DeJong's The Neurologic Examination", the value of the diameter φp of the pupil is 2 to 6 mm, and it is desirable that the minimum diameter of the pupil of the normal person is 2 mm.

Therefore, when the diameter φp of the pupil, the preset wavelength λ, each corresponding angle of diffusion θsn (i.e., each of the angles of diffusion θs1, θs2) of each optical element 32 and each corresponding length Dn (each of the lengths D1, D2) of the viewing range 60 are inputted to the equation 1, the lower limit value of each corresponding required pitch Pn (i.e., each of the pitches P1, P2), which is required to limit the blurring of the virtual image 70, can be obtained.

(2-2) Upper Limit Values of Pitches

Figure 15:
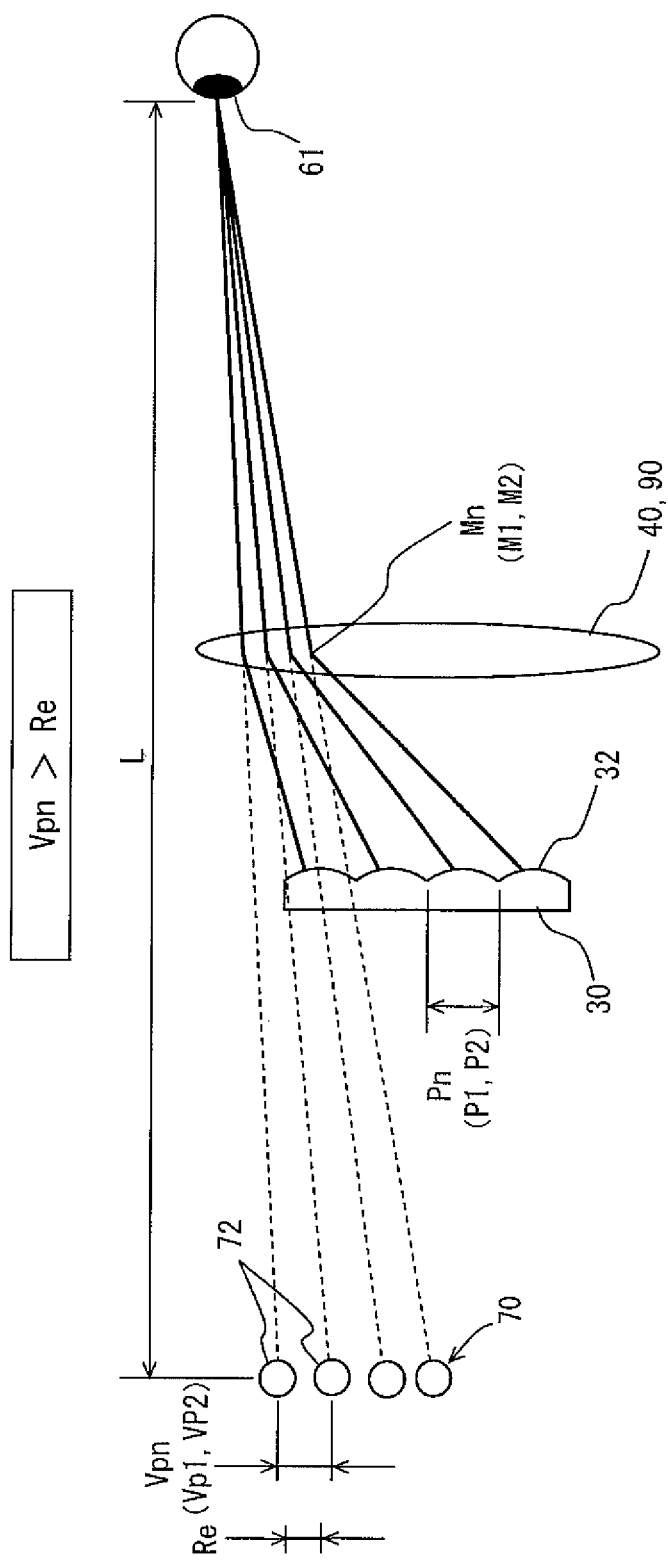
FIG. 15 is a schematic diagram for describing a disadvantage in a comparative example.

In the case where the pitch P1 in the horizontal direction x is set according to the equation 1 discussed in the above section (2-1), when the pitch P1 is increased, a pitch Vp1 of virtual image points 72 in the horizontal direction x is also increased, as shown in FIG. 15. The virtual image points 72 shown in FIG. 15 are formed by the diffused rays, which are diffused by the respective optical elements 32 to form the virtual image 70. Similarly, in the case where the pitch P2 in the vertical direction y is set according to the equation 1, when the pitch P2 is increased, a pitch Vp2 of the virtual image points 72 in the vertical direction y is also increased, as shown in FIG. 15. In the present embodiment, when the diffused rays, which are diffused by a corresponding one of the optical elements 32, are imaged, a corresponding virtual image point 72 is formed to form a corresponding pixel of the virtual image 70. Here, as shown in FIG. 2, the horizontal direction x of the respective virtual image points 72 generally coincides with the horizontal direction (the lateral direction, i.e., the left-to-right direction) of the vehicle 1. Furthermore, the vertical direction y of the respective virtual image points 72 generally coincides with the vertical direction (the top-to-bottom direction) of the vehicle 1 in the present embodiment. Alternatively, the vertical direction y of the respective virtual image points 72 may possibly be tilted relative to the vertical direction of the vehicle 1.

According to the result of the experiment conducted by the inventors of the present application, it has been found that as shown in FIG. 15, when any one of the pitches Vpn (n=1, 2) of the respective virtual image points 72 becomes larger than a resolution (also referred to as a resolving power) Re of the eye of the viewer, the outer edges 32e1-32e4 of each optical element 32 are visually recognized by the viewer as separate outer edges in the virtual image 70. More specifically, in the case of the optical element 32 configured into the shape of quadrangle having the four edges, these four edges formed in the virtual image 70 can be visually recognized as the separate four edges by the viewer if any of the pitches Vpn (n=1, 2) of the respective virtual image points 72 becomes larger than the resolution Re of the eye of the viewer. Furthermore, in the present embodiment, in the light path (optical path) of the diffused rays shown in FIG. 12, the diffused rays are enlarged by the optical system 40 (the concave mirror 42) alone or in cooperation with the windshield 90. Thereby, in each of the horizontal direction x and the vertical direction y, when each corresponding pitch Vpn (each of the pitches Vp1, Vp2) of the virtual image points 72, which are formed by enlarging the corresponding pitch Pn (i.e., the corresponding one of the pitches P1, P2) of the corresponding optical elements 32 by a corresponding predetermined magnification power (enlargement ratio) Mn (n=1, 2), is larger than the resolution Re, the viewer can visually recognize the outer edges 32e1-32e4 of each optical element 32 in the virtual image 70. That is, the viewer can visually discriminate the outer edges 32e1-32e4 of each optical element 32 from each other. With respect to the diffusing function of the windshield 90, in the case of the projection surface 91 that is formed as the concave surface, which is concave, i.e., is curved and is recessed in the direction away from the viewer, the projection surface 91 diffuses the bundle of rays of light, which is incident on the projection surface 91. In contrast, in the case of the projection surface 91 that is formed as the flat surface, the projection surface 91 does not substantially diffuse the bundle of rays of light. Furthermore, in FIGS. 15 and 16, the screen member 30 is enlarged from the actual scale of the screen member 30 to ease the understanding. Therefore, the size relationship between the pitch Vpn and the pitch Pn does not coincide with the actual size relationship between the pitch Vpn and the pitch Pn, i.e., is reversed from the actual size relationship.

Figure 16:
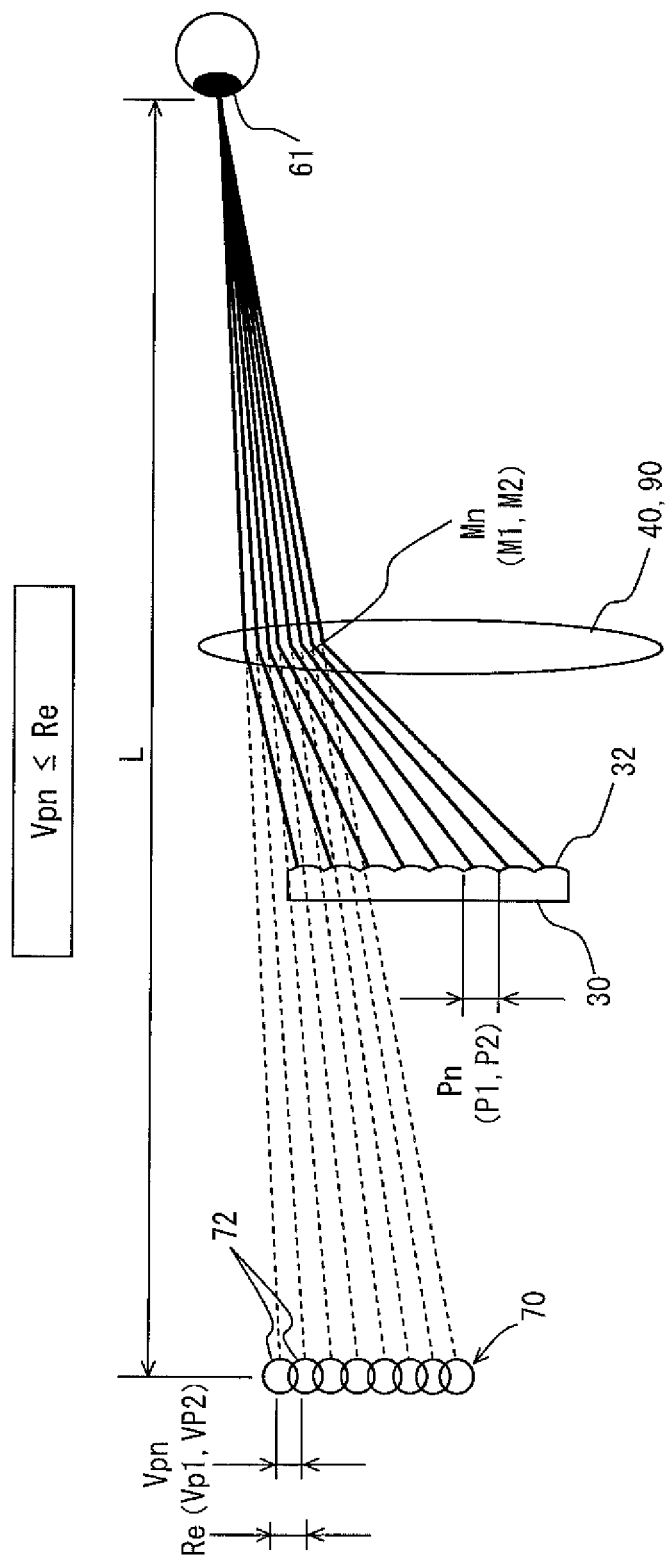
FIG. 16 is a schematic diagram for describing a characteristic feature of the first embodiment.

In the present embodiment, each corresponding pitch Pn (i.e., each of the pitches P1, P2) of each optical element 32 is set in the corresponding one of the horizontal direction x and the vertical direction y in such a manner that each corresponding pitch Vpn (i.e., each of the pitches Vp1, Vp2) of the respective virtual image points 72, each of which is enlarged by the corresponding magnification power Mn (i.e., the corresponding one of the magnification powers M1, M2), as indicated in FIG. 16, becomes equal to or smaller than the resolution Re of the eye to limit the visual discrimination of the outer edges 32e1-32e4 of each optical element 32 by the viewer. Specifically, at the respective virtual image points 72 of the virtual image 70 that is spaced from the viewing range 60 by the distance L, each corresponding pitch Pn (i.e., each of the pitches P1, P2) is set to satisfy the following equation 2, so that each corresponding pitch Vpn (each of the pitches Vp1, Vp2), which is expressed by Pn×Mn, becomes equal to or smaller than the resolution Re.

$$Pn \leq \frac{L}{Mn} \times \tan(Re) \qquad \text{Equation 2}$$

Figure 17:
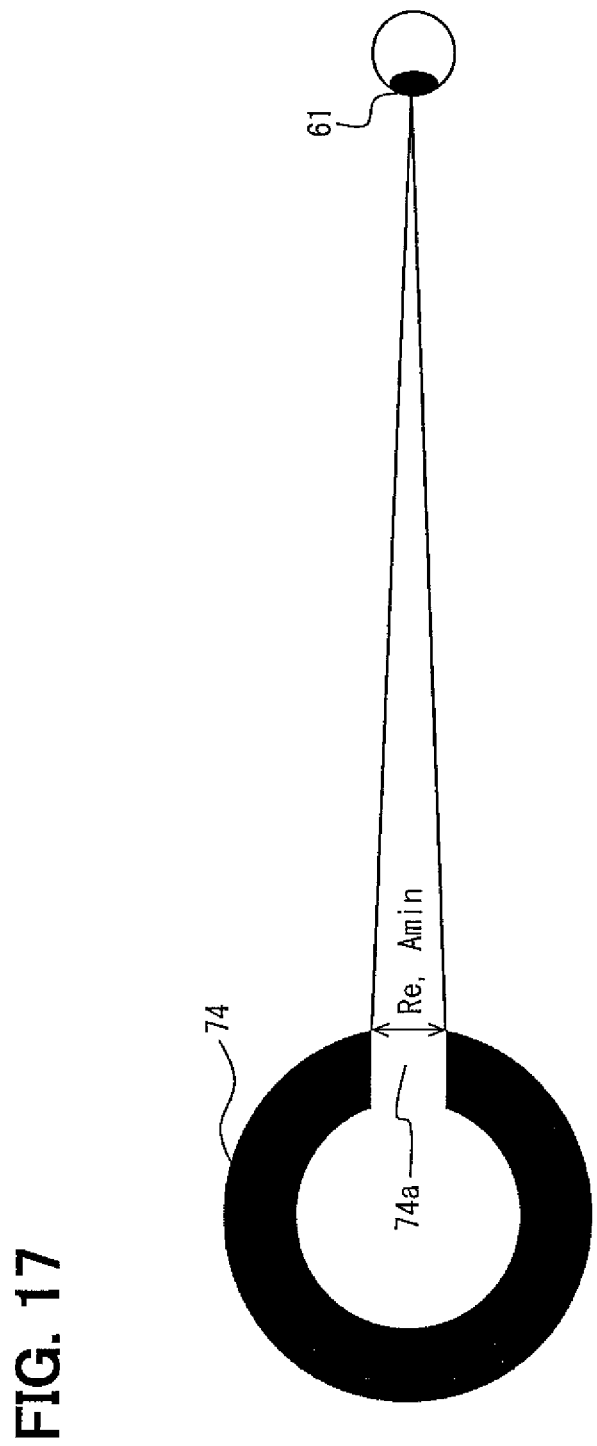
FIG. 17 is a schematic diagram illustrating an a Landolt ring for describing the design principles according the first embodiment.

As shown in FIG. 17, the resolution Re is expressed by a minimum angle Amin that is the smallest angle defined between two imaginary lines, each of which connects between the eye of the viewer and a corresponding one of two points (two dots), which are located in front of the viewer and which can be recognized as two separate points (two separate dots) by the viewer. A value of the resolution Re (the minimum angle Amin) is preset by using an angle (visual angle) of a gap 74a of a Landolt ring (also known as a Landolt C) 74, which is an optotype and is shown in FIG. 17. Specifically, the value of the resolution Re (the minimum angle Amin) is present in a range of a visual angle of $1/60$ to $1/30$ degrees, preferably $1/60$ degrees in a case where the Snellen acuity of the viewer is 1.0 (decimal), i.e., $20/20$ (fraction).

Furthermore, the distance L of the virtual image 70 from the viewing range 60 is preset in a range of, for example, 1,000 to 3,000 mm as a distance, which enables measurement of the viewing range 60 discussed in the above section (1-3). Furthermore, each corresponding magnification power Mn (i.e., each of the magnification powers M1, M2), which is a lateral magnification power achieved by the optical system 40 alone or in cooperation with the windshield 90, is preset in a range of 4 to 8 times, preferably 6 times in each of the horizontal direction x and the vertical direction y in view of the size of the HUD apparatus 100 and/or the size of the vehicle cabin 1a of the vehicle 1.

When the resolution Re, the distance L and each corresponding magnification power Mn (each of the magnification powers M1, M2), which are preset in the above-described manner, are applied to the equation 2, it is possible to obtain an upper limit value of each pitch Pn (i.e., each of the pitches P1, P2), which can limit the visual discrimination of the outer edges 32e1-32e4 of each optical element 32 by the viewer.

A value of each corresponding pitch Pn (i.e., each of the pitches P1, P2), which is in conformity with the design principles discussed in the sections (2-1), (2-2), is set as follows. Specifically, each of a value of the pitch P1 in the horizontal direction x and a value of the pitch P2 in the vertical direction y is set to be in a range of 50 to 200 μm, preferably 100 μm.

(3) Radius of Curvature of Optical Element

With respect to each optical element 32, for which the pitches P1, P2 are set, the radius of curvature R1 and the radius of curvature R2 of the curved surface 32a of each optical element 32 need to be set in order to project the diffused rays, which are diffused at the angle of diffusion θs1 and the angle of diffusion θs2 at the optical element 32, throughout the entire range of the viewing range 60. In the present embodiment, the radius of curvature R1 and the radius of curvature R2 are set based on the angle of diffusion θs1 and the angle of diffusion θs2 after the setting of the pitch P1 and the pitch P2, which satisfy the equation 1 of the above section (2-1) and the equation 2 of the above section (2-2). The principle of setting the radius R1 of curvature R1 and the radius of curvature R2 will be described.

Figure 18:
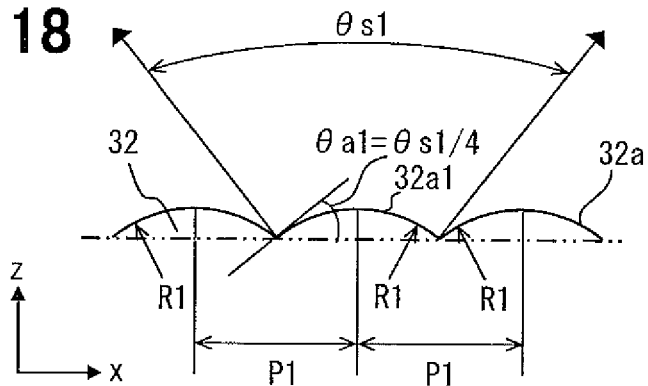
FIG. 18 is a schematic diagram illustrating the cross section of the optical element taken in the horizontal direction for describing the design principles according the first embodiment.
Figure 19:
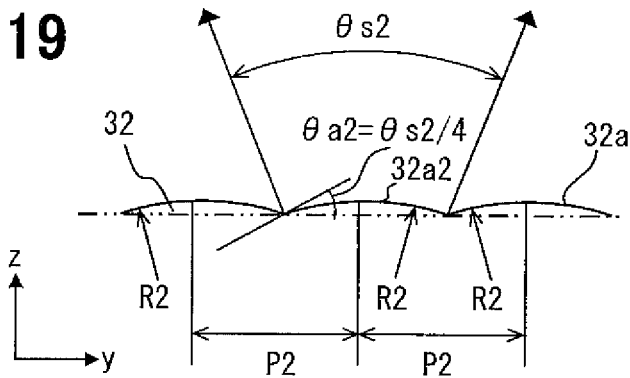
FIG. 19 is a schematic diagram illustrating the cross section of the optical element taken in the vertical direction for describing the design principles according the first embodiment.

In the horizontal direction x shown in FIG. 18, a tangent line, which is tangent to the corresponding arc 32a1 of the curved surface 32a at the outer edge of the curved surface 32a, defines an angle with respect to an x-y plane of the screen member 30 (a plane of the screen member 30 defined by the direction x and the direction y), which is indicated by a dot-dot-dash line in FIG. 18, and this angle is a maximum inclination angle θa1 of the curved surface 32a, which has the radius of curvature R1, in each optical element 32 and is substantially ¼ of the angle of diffusion θs1 of the optical element 32. Similarly, in the vertical direction y shown in FIG. 19, a tangent line, which is tangent to the arc 32a2 of the curved surface 32a at the outer edge of the curved surface 32a, defines an angle with respect to the x-y plane of the screen member 30, and this angle is a maximum inclination angle θa2 of the curved surface 32a, which has the radius of curvature R2, in each optical element 32 and is substantially ¼ of the angle of diffusion θs2 of the optical element 32.

Thereby, the maximum inclination angle θan (n=1, 2) in each of the horizontal direction x and the vertical direction y is expressed by an equation of θsn/4 by using the corresponding angle of diffusion θsn (i.e., the corresponding one of the angles of diffusion θs1, θs2). Furthermore, each corresponding radius of curvature Rn (n=1, 2) in the corresponding one the horizontal direction x and the vertical direction y is expressed by an equation of Pn/(2×sin(θan) by using the corresponding maximum inclination angle θan (i.e., the corresponding one of the maximum inclination angels θa1, θa2) and the corresponding pitch Pn (i.e., the corresponding one of the pitches P1, P2).

In the present embodiment, the radius of curvature Rn, which is obtained by applying the corresponding maximum inclination angle θan (i.e., the corresponding one of the maximum inclination angels θa1, θa2) in the equation of Pn/(2× sin(θan), is uniformly determined for each of the horizontal direction x and the vertical direction y. With respect to each optical element 32, for which each corresponding pitch Pn (i.e., each of the pitches P1, P2) that limits the blurring of the virtual image is set, each corresponding radius of curvature Rn (i.e., each of the radii of curvatures R1, R2), which does not deteriorate the function of limiting the blurring of the virtual image, is set to satisfy the following equation 3 that is set by using the corresponding angle of diffusion θsn (i.e., the corresponding one of angles of diffusion θs1, θs2) and the corresponding radius of curvature Rn (i.e., the corresponding one of the radii of curvature R1, R2).

$$Rn = \frac{Pn}{2 \times \sin\left(\frac{\theta sn}{4}\right)} \qquad \text{Equation 3}$$

Therefore, the curved surface 32a of each optical element 32 can have each corresponding radius of curvature Rn (i.e., each of the radii of curvature R1, R2), which does not deteriorate the function of limiting the blurring of the virtual image, by applying each corresponding angle of diffusion θsn (i.e., each of the angles of diffusion θs1, θs2) and each corresponding pitch Pn (i.e., each of the pitches P1, P2) of each optical element 32 discussed in the above sections (1) and (2). Therefore, in the present embodiment, in which the outer edges 60a-60d of the viewing range 60 form the elongated rectangle (oblong rectangle) that is elongated in the horizontal direction y, each corresponding radius of curvature Rn (i.e., each of the radii of curvature R1, R2) in the corresponding one of the horizontal direction x and the vertical direction y can be adjusted according to the corresponding pitch Pn (i.e., the corresponding one of the pitches P1, P2) in the corresponding one of the horizontal direction x and the vertical direction y. For example, in the case where the pitch P1 and the pitch P2 are set to be substantially an identical value (see FIG. 5B) for the viewing range 60 that is elongated in the horizontal direction x, the radius of curvature R1 can be set to be smaller than the radius of curvature R2. Alternatively, in the case the ratio between the pitch P1 and the pitch P2 is set to be substantially equal to the ratio between the length D1 and the length D2 of the viewing range 60 elongated in the horizontal direction x, the radius of curvature R1 and the radius of curvature R2 can be set to be substantially an identical value.

The value of each corresponding radius of curvature Rn is set as follows. Specifically, the radius of curvature R1 in the horizontal direction x is set to be in a range of, for example, 0.1 to 2 mm, preferably 0.4 mm, and the radius of curvature R2 in the vertical direction y is set to be in a range of, for example, 1 to 2 mm, preferably 1 mm. With respect to the screen member 30, in which each corresponding radius of curvature Rn (i.e., each of the radii of curvature R1, R2) and each corresponding pitch Pn (i.e., each of the pitches P1, P2) are set for each optical element 32, when the substrate of the screen member 30 is formed from the resin material, manufacturing of a molding die, which is used to resin-mold the substrate, needs to be elaborated. Specifically, at the manufacturing of the molding die (molding device), which is used to mold the substrate of the screen member 30, in a process of forming a cavity surface of the molding die, which is used to form the curved surface 32a, a single-point tool is repeatedly driven in the direction y in the x-z plane to three-dimensionally process the cavity surface.

The screen member 30 may be advantageously manufactured according to the above described principles. Furthermore, at the time of determining the corresponding design values (design parameters), such as each corresponding pitch Pn (more specifically each of the pitches P1, P2) of the optical elements 32 and each corresponding radius of curvature Rn (more specifically each of the radii of curvature R1, R2) of each corresponding arc 32a1, 32a2 of the curved surface 32a of the optical elements 32, a well known computer (a computing device) and a dedicated design software may be used. At that time, the various values, which are required to determine the design values (design parameters) and are discussed in view of the above equations, may be inputted to the computer through, for example, a keyboard, to determine the design values (design parameters). Thereafter, the screen member 30, which is designed with the corresponding design values (design parameters), may be formed by, for example, the molding process discussed above, a cutting process, a machining process or the like. The above discussion of the manufacturing of the screen member 30 is also applicable to the second embodiment discussed below.

Now, advantages of the first embodiment will be described.

According to the first embodiment, each corresponding one of the optical elements 32, which are arranged at each corresponding predetermined pitch Pn (i.e., the pitch P1 in the horizontal direction x and the pitch P2 in the vertical direction y) in the lattice pattern, diffuses the corresponding bundle of rays of light projected from the laser scanner 10, and the bundles of rays, which are diffused by the optical elements 32, are projected into the viewing range 60 through the optical system 40 and the windshield 90. At this stage, the diffraction of the bundles of rays, which are diffused by the optical elements 32, occurs. Each corresponding peak-to-peak interval $\Delta dn$ (i.e., the peak-to-peak intervals $\Delta d1$, $\Delta d2$) of the diffracted rays is made equal to or smaller than the diameter $\phi p$ of the pupil of the viewer through the setting of each corresponding pitch Pn (i.e., each of the pitches P1, P2) in the corresponding one of the horizontal direction x and the vertical direction y such that each corresponding pitch Pn (i.e., each of the pitches P1, P2) satisfies the equation 1. Here, in the case where 2 mm, which is the minimum diameter of the pupil of the normal person during the daytime, is preset as the $\phi p$ of the equation 1, each peak-to-peak interval $\Delta dn$ (each of the peak-to-peak intervals $\Delta d1$, $\Delta d2$) of the diffracted rays become equal to or smaller than 2 mm through the setting of each corresponding pitch Pn (i.e., each of the pitches Pn1, Pn2) that satisfies the equation 1. Thereby, the diffraction peak (having the peak value) of the diffracted rays, which are formed by the diffraction of the bundles of rays of light diffused by the optical elements 32, can be placed in the pupil of the viewer regardless of the movement of the eye point 61 of the viewer.

Therefore, even when the eye point is moved between the adjacent diffraction peaks (e.g., the zero-order diffraction peak and the first-order diffraction peak) of the diffracted rays, which are arranged at the corresponding peak-to-peak interval $\Delta dn$ (i.e., the corresponding one of the peak-to-peak intervals $\Delta d1$, $\Delta d2$) that is equal to or larger than the diameter $\phi p$ of the pupil of the viewer, the change in the quantity of the incident light can be effectively limited. Thereby, the brightness variation, which is sensed by the viewer, can be effectively limited. As a result, in the viewing range 60, it is possible to limit the blurring of the virtual image 70 that is recognized by the viewer upon the incident of the rays, which form the display image 71, onto the eye of the viewer.

Furthermore, according to the first embodiment, the multiple colors of the single-wavelength laser lights, which are diffused by the respective optical elements 32 and enter the viewing range 60, have the narrow bandwidth, in which the peak wavelength is centered. Therefore, in the previously proposed technique, in which the brightness variation is generated between the diffraction peaks (maxima) and the interposed troughs (minima), the brightness variation, which is sensed by the viewer, is notable. In contrast, when the maximum wavelength among the peak wavelengths of the respective colors of the laser lights is preset as the wavelength $\lambda$ of the equation 1, each corresponding peak-to-peak interval $\Delta dn$ (i.e., each of the peak-to-peak intervals $\Delta d1$, $\Delta d2$) of the diffracted rays becomes equal to or smaller than the diameter $\phi p$ of the pupil for all of the colors of the laser lights. Thus, the brightness variation, which is sensed by the viewer, is reliably limited. As a result, even in the case where the bundle of rays, which form the display image 71, is produced from the single wavelength laser light that possibly induces the blurring of the virtual image 70 in the previously proposed technique, the blurring of the virtual image 70 can be advantageously limited according to the first embodiment.

Furthermore, according to the first embodiment, the virtual image points 72 are formed by the diffused rays, which are diffused by the respective optical elements 32 arranged at each corresponding predetermined pitch Pn (i.e., each of the pitches P1, P2) to form the virtual image 70. Each corresponding pitch Vpn (i.e., each of the pitches Vp1, Vp2) of the virtual image points 72 is made to be equal to or smaller than the resolution Re of the eye of the viewer by setting each corresponding pitch Pn (i.e., each of the pitches P1, P2) in the corresponding one of the horizontal direction x and the vertical direction y such that each corresponding pitch Pn (i.e., each of the pitches P1, P2) satisfies the equation 2. Therefore, at the viewing range 60, it is possible to limit the recognition of the outer edges 32e1-32e4 of each optical element 32 by the viewer as the separate outer edges in the virtual image 70. Therefore, it is possible to limit the deterioration of the display quality of the virtual image 70, which is caused by the recognition of the outer edges 32e1-32e4 of each optical element 32 by the viewer as the separate outer edges in the virtual image 70.

Furthermore, according to the first embodiment, each corresponding pitch Vpn (i.e., each of the pitches Vp1, Vp2) of the respective virtual image points 72 is enlarged relative to the corresponding pitch Pn (i.e., the corresponding one of the pitches P1, P2) of the respective optical elements 32 through the optical system 40 alone or in cooperation with the windshield 90 along the optical path of the bundles of rays, which are diffused by the corresponding optical elements 32 and are projected onto the projection surface 91. However, when each corresponding pitch Pn (i.e., each of the pitches P1, P2) is set to satisfy the equation 2, the corresponding enlarged pitch Vpn becomes equal to or smaller than the resolution Re of the eye of the viewer. Therefore, it is possible to limit the recognition of the outer edges 32e1-32e4 of each optical element 32 by the viewer as the separate outer edges in the virtual image 70. Thus, it is possible to limit the deterioration of the display quality of the virtual image 70, which is caused by the recognition of the outer edges 32e1-32e4 of each optical element 32 by the viewer as the separate outer edges in the virtual image 70 regardless of the enlargement of the bundle of rays of light.

Furthermore, according to the first embodiment, when the outer edges 32e1-32e4 of each optical element 32 define the shape of square, as shown in FIG. 5A, each corresponding pitch Pn (i.e., each of the pitches P1, P2), which is the same in each of the horizontal direction x and the vertical direction y, can easily satisfy the equation 1 and the equation 2 in each of the horizontal direction x and the vertical direction y. Thereby, the time, which is required to set each corresponding pitch Pn (i.e., each of the pitches P1, P2), can be shortened to improve the productivity.

Furthermore, according to the first embodiment, in each of the optical elements 32, which are arranged at each corresponding pitch Pn (i.e., each of the pitches P1, P2) that are set to limit the blurring of the virtual image 70, each corresponding radius of curvature Rn (i.e., each of the radii of curvature R1, R2) of the curved surface 32a is uniformly determined relative to the corresponding angle of diffusion θsn (i.e., the corresponding one of the angles of diffusion θs1, θs2) that is set to project the bundle of rays, which are diffused by the corresponding optical element 32, into the entire range of the viewing range 60. Therefore, according to the design principle, which is based on the equation 3 that limits the blurring of the virtual image 70, each corresponding radius of curvature Rn (the radius of curvature R1 or the radius of curvature R2), which does not deteriorate the function of limiting the blurring, can be set in each of the directions (opposing directions) x, y.

The viewing range 60, which is configured into the shape of quadrangle (rectangle) with the four outer edges 60a-60d, has the length D1 in the horizontal direction x and the length D2 in the vertical direction y, along which the eye point 61 is likely to move in the vehicle cabin 1a of the vehicle 1. According to this configuration, the bundle of rays is projected into the moving range of the eye point 61, which is required to visually recognize the virtual image 70, without the substantial loss of the bundle of rays, so that the energy efficiency can be improved.

Furthermore, according to the first embodiment, the viewing range 60, which is set for both of the eyes of the viewer, is configured into the shape of elongated rectangle (oblong rectangle). Therefore, the viewing range 60 has the length D1 in the horizontal direction x, which is larger than the length D2 in the vertical direction y. Here, the length D1 in the horizontal direction x is made larger than the length D2 in the vertical direction y since the eye points (eyes) 61 together with the head of the viewer tend to move in the horizontal direction x rather than the vertical direction y. According to this configuration, the bundle of rays is projected into the moving range (viewing range) of the eye points 61, which is required to visually recognize the virtual image 70 with the two eyes of the viewer, without the substantial loss of the bundle of rays, so that the energy efficiency can be improved.

Second Embodiment

Figure 20:
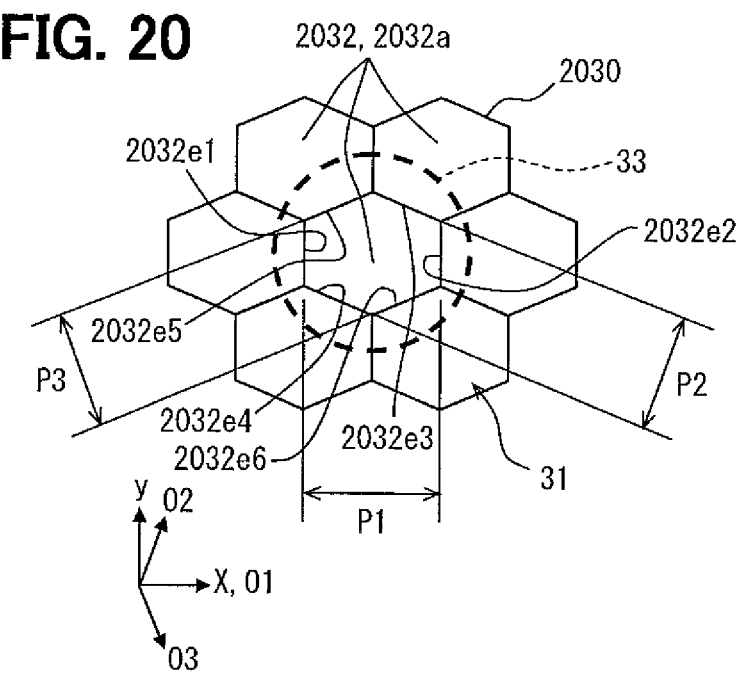
FIG. 20 is a partial front view of a screen member according to a second embodiment of the present disclosure.
Figure 21:
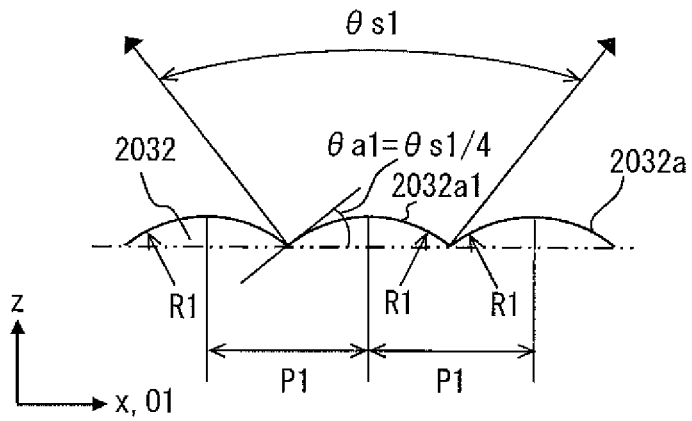
FIG. 21 is a schematic diagram illustrating a cross section of an optical element taken in one opposing direction for describing design principles according the second embodiment.
Figure 22:
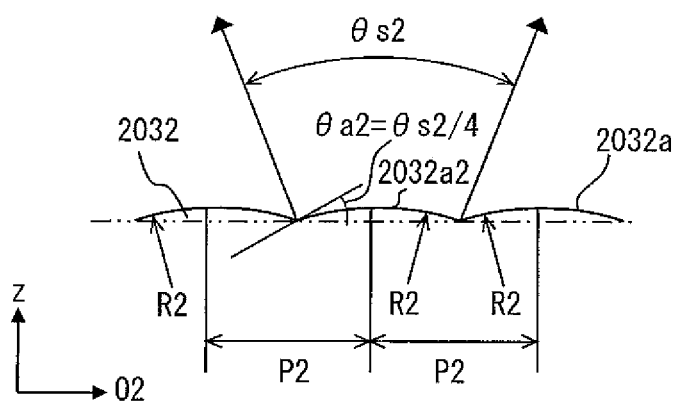
FIG. 22 is a schematic diagram illustrating a cross section of the optical element taken in another opposing direction for describing the design principles according the second embodiment.
Figure 23:
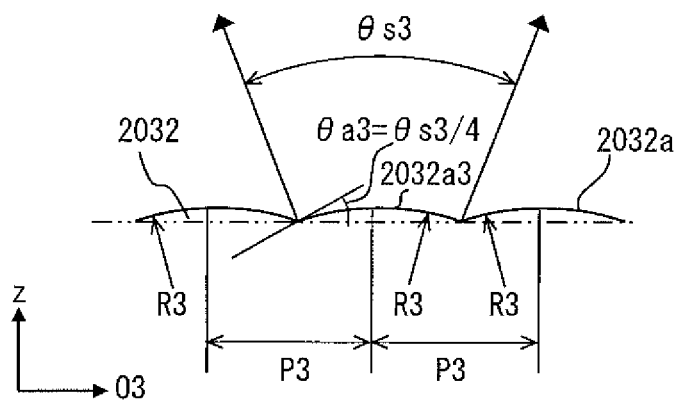
FIG. 23 is a schematic diagram illustrating a cross section of the optical element taken in another opposing direction for describing the design principles according the second embodiment.

As shown in FIGS. 20 to 24, the second embodiment of the present disclosure is a modification of the first embodiment.
(Design Principles)
In the following discussion, the design principles of the second embodiment will be described mainly with respect to the differences, which are different from those of the first embodiment.
(1) Relationship Between Optical Elements and Viewing Range
(1-1) Configuration of Optical Element
With reference to FIG. 20, a curved surface 2032a of each of a plurality of optical elements 2032 of a screen member 2030 is a convex surface, which is curved and protrudes toward the laser scanner 10 in the direction z (see FIG. 2). The curved surface 2032a of the optical element 2032 is configured into a shape of hexagon having six outer edges 2032e1-2032e6 in the view taken in the direction z. The hexagon, which is formed by the outer edges 2032e1-2032e6 of the curved surface 2032a, is a polygon, in which the total number of the outer edges 2032e1-2032e6 is defined by 2N where N is 3 (integer number), and the total number of directions (first to third opposing directions) O1, O2, O3, in each of which corresponding parallel two of the outer edges 2032e1-2032e6 are opposed to each other, is N. As shown in FIG. 21, in a cross section of each optical element 2032 taken in the opposing direction O1, an arc 2032a1 of the curved surface 2032a of the optical element 2032, which is arcuately curved in the opposing direction O1, has a radius of curvature R1. Also, as shown in FIG. 22, in a cross section of each optical element 2032 taken in the opposing direction O2, an arc 2032a2 of the curved surface 2032a of the optical element 2032, which is arcuately curved in the opposing direction O2, has a radius of curvature R2. Furthermore, as shown in FIG. 23, in a cross section of each optical element 2032 taken in the opposing direction O3, an arc 2032a3 of the curved surface 2032a of the optical element 2032, which is arcuately curved in the opposing direction O3, has a radius of curvature R3. The opposing direction O1 of each optical element 2032 generally coincides with the horizontal direction x of the screen member 30 and the horizontal direction of the vehicle 1. Each of the opposing directions O2, O3 of each optical element 32 crosses, i.e., is angled relative to the horizontal direction x at a corresponding angle that is other than a right angle on the x-y plane of the screen member 2030 while the vertical direction y of the screen member 2030 is tilted or coincides with the vertical direction of the vehicle.

As shown in FIGS. 20 to 23, the optical elements 2032 are arranged side-by-side in the lattice pattern (the honeycomb lattice pattern in this instance) such that the corresponding outer edges 2032e1-2032e6 of each adjacent two of the curved surfaces 2032a of the optical elements 2032 overlap with each other, and the optical elements 2032 are arranged one after another in the opposing direction O1 at the predetermined pitches P1, in the opposing direction O2 at the predetermined pitches P2 and in the opposing direction O3 at the predetermined pitches P3. The pitches P1, P2, P3 of the optical elements 2032 may be different to form the hexagon (i.e., the irregular hexagon) having different interior angles defined by the outer edges 2032e1-2032e6 of each curved surface 2032a. Here, only one of the pitches P1, P2, P3 may be different from the other two of the pitches P1, P2, P3, and the other two of the pitches P1, P2, P3 may be identical to each other. Also, all three of the pitches P1, P2, P3 may be different from each other. Alternatively, the pitches P1, P2, P3 of the optical elements 2032 may be identical to each other to form the hexagon (i.e., the regular hexagon) having identical interior angles defined by the outer edges 2032e1-2032e6 of each curved surface 2032a. In the case of the shape of hexagon, which is defined by the six outer edges 2032e1-2032e6 of the optical element 2032, as shown in FIG. 20, the pitch P1 may be measured between the corresponding two parallel outer edges 2032e1-2032e2, which are parallel to each other and are spaced from each other in the opposing direction O1, and the pitch P2 may be measured between the other two parallel edges 2032e3-2032e4, which are parallel to each other and are spaced from each other in the opposing direction O2. Furthermore, the pitch P3 may be measured between the other two parallel outer edges 2032e5-2032e6, which are parallel to each other and are spaced from each other in the opposing direction O3. Alternatively, as shown in FIGS. 21 to 23, the pitch P1 may be measured between centers of each adjacent two optical elements 2032, which are adjacent to each other in the opposing direction O1, and the pitch P2 may be measured between centers of each adjacent two optical elements 2032, which are adjacent to each other in the opposing direction O2. Furthermore, the pitch P3 may be measured between centers of each adjacent two optical elements 2032, which are adjacent to each other in the opposing direction O3.

(1-2) Shape of Viewing Range

Figure 24:
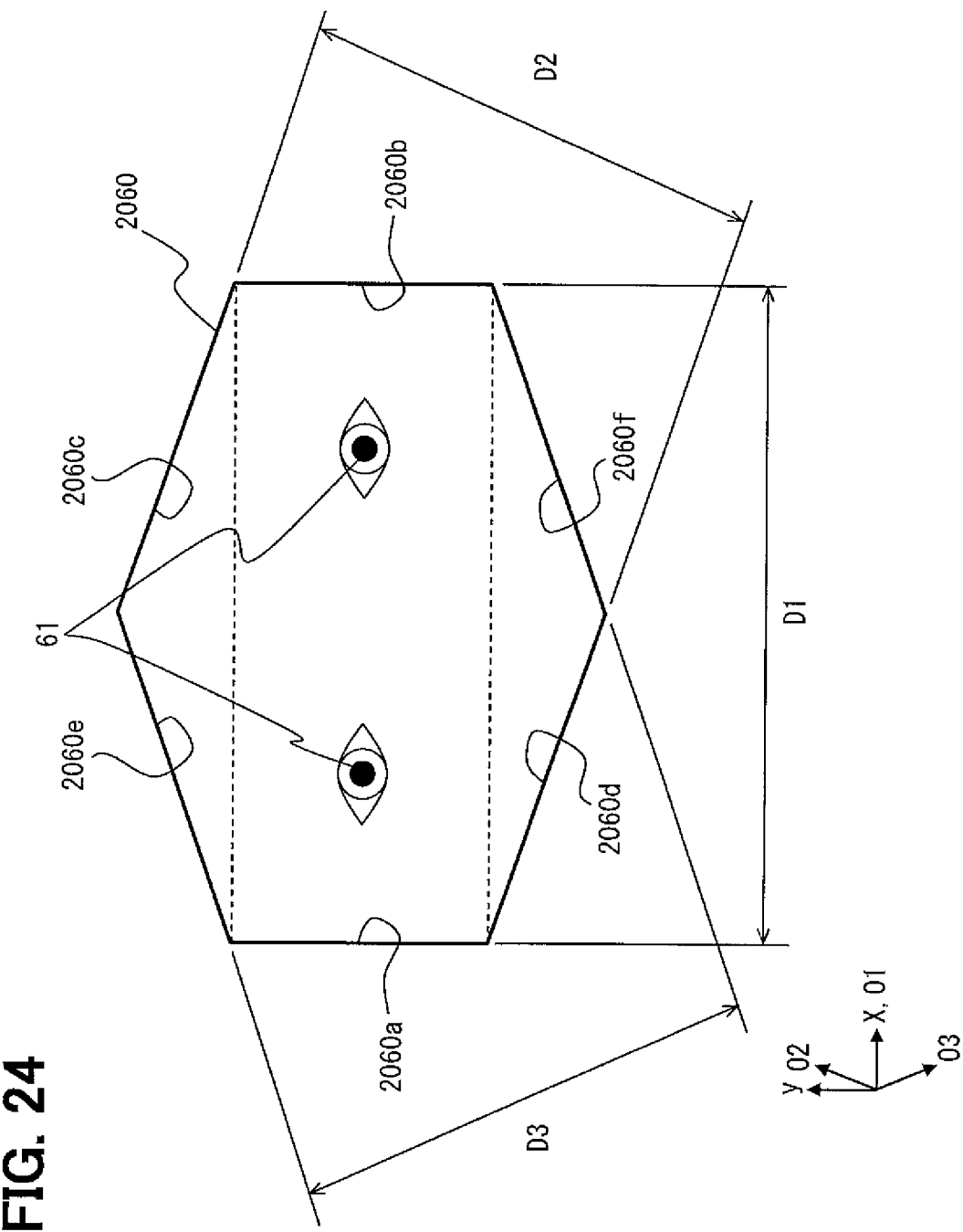
FIG. 24 is a schematic enlarged diagram showing a viewing range according to the second embodiment.

The viewing range 2060 is configured to correspond with the shape of each optical element 2032. In the present embodiment, as shown in FIG. 24, the viewing range 2060 is configured into a shape of hexagon that corresponds to, i.e., is homothetic to the shape of hexagon of each optical element 2032 (i.e., the shape of hexagon of the curved surface 2032a). The viewing range 2060, which is configured into the shape of hexagon, has a length D1 in the opposing direction O1 (i.e., the horizontal direction x), a length D2 in the opposing direction O2 and a length D3 in the opposing direction O3. The hexagon, which is formed by the outer edges 2060a-2060f of the viewing range 2060, is a polygon, in which the total number of the outer edges 2060a-2060f is equal to, i.e., is defined by 2N where N is 3, and the total number of directions (opposing directions) O1, O2, O3, in each of which corresponding parallel two of the outer edges 2060a-2060f are opposed to each other, is N. The opposing direction O1 of the viewing range 2060 generally coincides with the horizontal direction (the lateral direction, i.e., the left-to-right direction) of the vehicle 1. Each of the opposing directions O2, O3 of the viewing range 2060 crosses, i.e., is angled relative to the horizontal direction x at a corresponding angle that is other than a right angle on the vertical plane of the vehicle 1.

With respect to the viewing range 2060 of the second embodiment shown in FIG. 24, the viewing range 2060 is configured into the shape of the hexagon such that the length D1 of the viewing range 2060 measured in the opposing direction O1, which coincides with the horizontal direction x, is larger than the length D2 of the viewing range 2060 measured in the opposing direction O2 and the length D3 of the viewing range 2060 measured in the opposing direction O3. The length D1 of the viewing range 2060 measured in the opposing direction O1 is in a range of, for example, 80 to 200 mm, preferably 130 mm. Each of the length D2 of the viewing range 2060 measured in the opposing direction O2 and the length D3 of the viewing range 2060 measured in the opposing direction O3 is in a range of, for example, 70 to 180 mm, preferably 114 mm. The viewing range 2060 of the second embodiment is also set to be swingable upward or downward in the vertical direction in response to the swing movement of the concave mirror 42 and is set to be at least partially located in the range of the eyellipse 62 even upon movement of the viewing range 2060 within the swingable range of the viewing range 2060.

(1-3) Relationship Between Angle of Diffusion at Optical Element and Viewing Range As shown in FIGS. 21 to 23, each optical element 2032 reflects the bundle of rays of light projected from the laser scanner 10 and diffuses the bundle of rays of light. Specifically, the optical element 2032 diffuses the bundle of rays in the opposing direction O1 at an angle of diffusion $\theta s1$ (see FIG. 21), in the opposing direction O2 at an angle of diffusion $\theta s2$ (see FIG. 22) and in the opposing direction O3 at an angle of diffusion $\theta s3$ (see FIG. 23). The definition of each angle of diffusion $\theta s1$, $\theta s2$, $\theta s3$ with respect to the light intensity of the bundle of rays of light outputted from the laser scanner 10 is the same as that of the first embodiment. Specifically, the angular range, in which the light intensity of the rays of light reflected from the optical element 32 is substantially constant, is defined to have the angle of diffusion $\theta s1$ in the opposing direction O1, the angle of diffusion $\theta s2$ in the opposing direction O2 and the angle of diffusion $\theta s3$ in the opposing direction O3. Furthermore, in the second embodiment, the rays, which are diffused by each corresponding optical element 2032 at the angles of diffusion $\theta s1$, $\theta s2$, $\theta s3$, are adjusted to enter the entire range of the viewing range 2060 by adjusting the angles of diffusion $\theta s1$, $\theta s2$, $\theta s3$ in a manner similar to that of the first embodiment.

(2) Pitch Setting (2-1) Lower Limit Values of Pitches

In the second embodiment, the principles of the first embodiment with respect to the physical quantities Pn, Dn, $\Delta dn$, $\theta dn$, $\theta sn$, Mn (n=1, 2) in each of the directions x, y are also applicable between each optical element 2032 and the viewing range 2060 by replacing the physical quantities Pn, Dn, $\Delta dn$, $\theta dn$, $\theta sn$, Mn (n=1, 2) in each of the directions x, y discussed in the first embodiment with the physical quantities Pn, Dn, $\Delta dn$, $\theta dn$, $\theta sn$, Mn (n=1, 2, 3) in each of the opposing directions O1, O2, O3, respectively. Therefore, when each corresponding pitch Pn (i.e., each of the pitches P1, P2, P3) of the respective optical elements 2032 in the corresponding one of the opposing directions O1, O2, O3 shown in FIGS. 20 to 24 is set to satisfy the equation 1, each corresponding peak-to-peak interval $\Delta dn$ (i.e., each of the peak-to-peak intervals $\Delta d1$, $\Delta d2$, $\Delta d3$) of the diffracted rays becomes equal to or smaller than the diameter $\phi p$ of the pupil, and thereby the blurring of the virtual image 70 can be advantageously limited.

(2-2) Upper Limit Values of Pitches

In the second embodiment, the principles of the first embodiment with respect to the physical quantities Pn, Vpn, Mn (n=1, 2) in each of the directions x, y are also applicable between each optical element 2032 and the viewing range 2060 by replacing the physical quantities Pn, Vpn, Mn (n=1, 2) in each of the directions x, y discussed in the first embodiment with the physical quantities Pn, Vpn, Mn (n=1, 2) in each of the opposing directions O1, O2, O3, respectively. Therefore, each corresponding pitch Pn (i.e., each of the pitches P1, P2, P3) of the respective optical elements 2032 becomes equal to or smaller than the resolution Re. Thereby, it is possible to limit the visual discrimination of the outer edges 2032e1-2032e6 of each optical element 2032 by the viewer.

A value of each corresponding pitch Pn (i.e., each of the pitches P1, P2, P3), which is in conformity with the design principles discussed in the sections (2-1), (2-2), is set as follows. Specifically, a value of the pitch P1 in the opposing direction O1 is in a range of, for example, 50 to 200 μm, preferably 100 μm, and each of a value of the pitch P2 in the opposing direction O2 and a value of the pitch P3 in the opposing direction O3 is set to be in a range of, for example, 45 to 180 μm, preferably 90 μm.

(3) Radius of Curvature of Optical Element

In the second embodiment, the principles of the first embodiment with respect to the physical quantities Rn, Pn, elan, $\theta sn$ (n=1, 2) in each of the directions x, y are also applicable between each optical element 2032 and the viewing range 2060 by replacing the physical quantities Rn, Pn, $\theta an$, $\theta sn$ (n=1, 2) in each of the directions x, y discussed in the first embodiment with the physical quantities Rn, Pn, $\theta an$, $\theta sn$ (n=1, 2, 3) in each of the opposing directions O1, O2, O3, respectively, shown in FIGS. 21 to 23. Therefore, the relationship between each corresponding angle of diffusion $\theta sn$ (i.e., each of the angles of diffusions $\theta s1$, $\theta s2$, $\theta s3$) of the rays to be entered into the entire range of the viewing range 2060 and the corresponding radius of curvature Rn (i.e., the corresponding one of the radii of curvatures R1, R2) is set to satisfy the equation 3 that is set by using the corresponding angle of diffusion θsn (i.e., the corresponding one of angles of diffusion θs1, θs2, θs3) and the corresponding radius of curvature Rn (i.e., the corresponding one of the radii of curvature R1, R2, R3) of the curved surface 2032a. The value of the radius of curvature Rn is set as follows. Specifically, each of the radius of curvature R1 in the opposing direction O1, the radius of curvature R2 in the opposing direction O2, and the radius of curvature R3 in the opposing direction O3 is set to be in a range of, for example, 0.1 to 2 mm, preferably 0.4 mm.

With the above described structure of the second embodiment, the advantages similar to those of the first embodiment can be achieved.

The first and second embodiments of the present disclosure have been described. However, the present disclosure is not limited to the above embodiments, and the above embodiments may be modified within a spirit and scope of the present disclosure.

Specifically, as a first modification of the first or second embodiment, when the operation of the HUD apparatus 100 is limited to the nighttime, the diameter φp of the pupil may be set to a minimum value, e.g., 7 to 8 mm of the diameter of the pupil of the viewer that is enlarged due to a reduction in the luminous energy during the nighttime in comparison to the daytime.

Furthermore, as a second modification of the first or second embodiment, the shape of each optical element 32, 2032 (i.e., the configuration of the outer edges 32e1-32e4, 2032e1-2032e6 of each optical element 32, 2032) may be appropriately modified. For example, the shape of each optical element 32, 2032 may be changed to any other type of polygon, in which the total number of the outer edges is equal to, i.e., defined by 2N where N is 4 or a larger integer number that is larger than 4, and the total number of directions (opposing directions), in each of which corresponding parallel two of the outer edges are opposed to each other, is N.

Furthermore, as a third modification, the shape of the viewing range 60, 2060 may be changed to any other shape. For example, in the first embodiment, the viewing range 60 may be configured into a shape of square defined by four outer edges, which are arranged such that the length D1 in the horizontal direction x and the length D2 in the vertical direction y are identical to each other, or a shape of elongated rectangle (oblong rectangle) defined by four outer edges, which are arranged such that the length D2 in the vertical direction y is larger than the length D1 in the horizontal direction x. Further alternatively, the shape of the viewing range 60, 2060 may be changed to any other type of polygon, in which the total number of the outer edges is equal to, i.e., is defined by 2N where N is 4 or a larger integer number that is larger than 4, and the total number of directions (opposing directions), in each of which corresponding parallel two of the outer edges are opposed to each other, is N.

Figure 25:
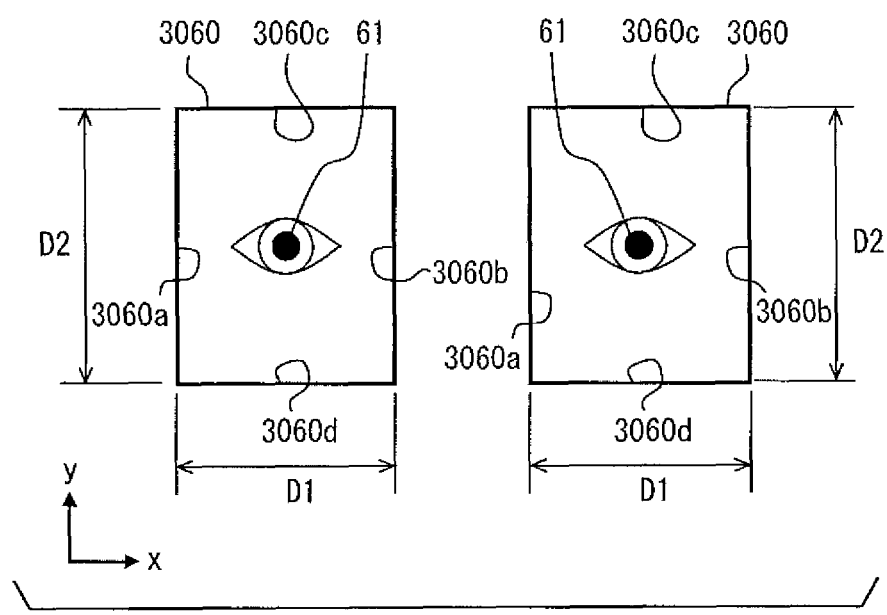
FIG. 25 is a schematic diagram, showing a modification of the viewing range of the first embodiment shown in FIG. 9.

Furthermore, as a fourth modification, the viewing range 3060 may be set for each of the two eyes of the viewer, as shown in FIG. 25. For example, in the fourth modification, each of the two viewing ranges 3060, which correspond to the two eye points 61, respectively, may be configured into a shape of square defined by four outer edges 3060a-3060d, which are arranged such that the length D1 in the horizontal direction x and the length D2 in the vertical direction y are identical to each other, or a shape of elongated rectangle (oblong rectangle) defined by four outer edges 3060a-3060d, which are arranged such that the length D2 in the vertical direction y is larger than the length D1 in the horizontal direction x. Here, it is preferred that the length D1 of each viewing range 3060 in the horizontal direction x is in a range of, for example, 40 to 100 mm, preferably 65 mm, and the length D2 of the viewing range 3060 in the vertical direction y is in a range of, for example, 30 to 200 mm, preferably 50 mm. Alternatively, the shape of the viewing range 3060 may be changed to any other type of polygon, in which the total number of the outer edges is equal to, i.e., is defined by 2N where N is 3 or a larger integer number that is larger than 3, and the total number of directions (opposing directions), in each of which corresponding parallel two of the outer edges are opposed to each other, is N. Furthermore, in such a case where the two viewing ranges 3060 are provided to the two eye points 61 (i.e., the left and right eyes), respectively, of the viewer, two sets of the laser scanner 10, the screen member 30, 2030 and the optical system 40 may be provided in the housing 50 for the left eye and the right eye, respectively, of the viewer. Also, at that time, by using the parallax on the virtual image 70, which is viewed through the viewing ranges 3060, it is possible to implement a three-dimensional (3D) display with the depth.

Furthermore, as a fifth modification of the first or second embodiment, among the design principles discussed in the first or second embodiment, at least one of the design principle of (2-2) and the design principle of (3) may not need to be taken into account. Specifically, each optical element 32, 2032 may be designed such that at least one of the equation 2 and the equation 3 is not taken into account.

Furthermore, as a sixth modification, the number of the optical elements 32, 2032 provided to each pixel of the display image 71 is not limited to one (not limited to have one to one relationship between the optical elements 32, 2032 and the pixels of the display image 71) and may be changed to any other number. For example, two or more of the optical elements 32, 2032 may be assigned to each pixel of the display image 71, so that each pixel of the virtual image 70 is formed by two or more virtual image points 72, each of which is formed by the corresponding bundle of rays of light diffused by the corresponding one of the optical elements 32, 2032.

Figure 26:
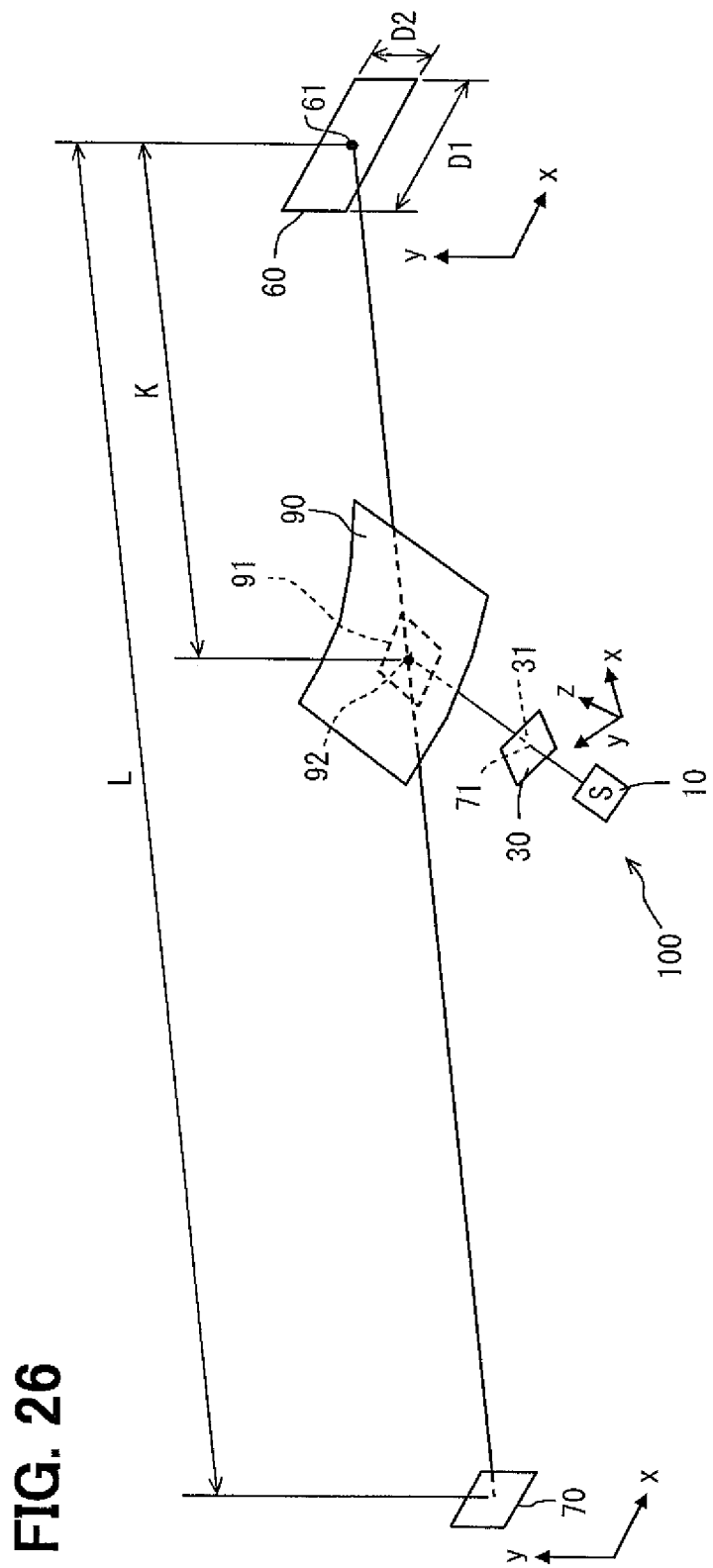
FIG. 26 is a schematic perspective view showing a modification of the structure of the HUD apparatus of the first embodiment shown in FIG. 2.

Furthermore, as a seventh modification of the first or second embodiment, the screen member 30, 2030 may be made as a transmission screen member, which is made of a light transmissive material, and each of the optical elements 32, 2032 may be made as a micro-lens. In the seventh modification, as shown in FIG. 26 (showing the seventh modification of the first embodiment), the laser light is projected onto the screen member 30, 2030 from the opposite side of the screen member 30, 2030, which is opposite from the scanning surface 31. In such a case, the bundle of rays of light, which is transmitted through the screen member 30, 2030, is outputted from the optical element 32, 2032 located in the scanning surface 31.

Figure 27:
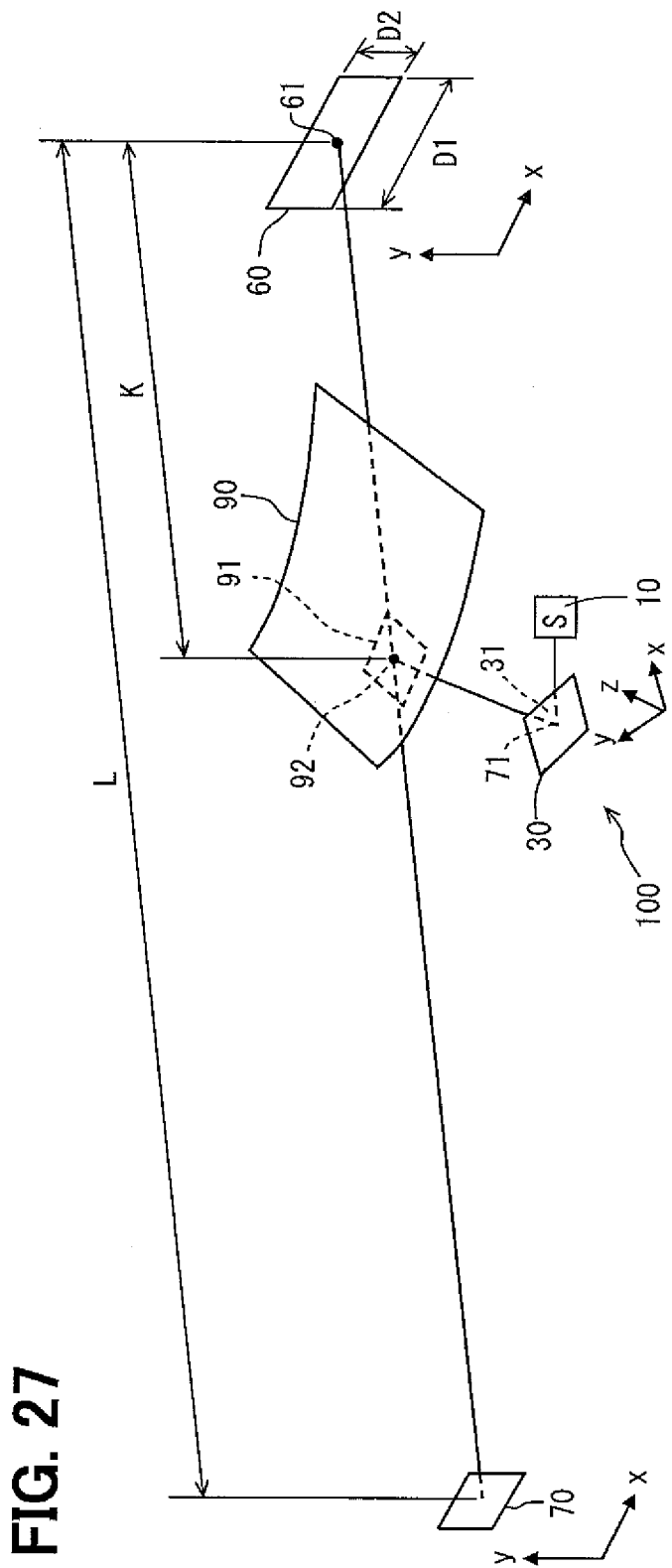
FIG. 27 is a schematic perspective view showing another modification of the structure of the HUD apparatus of the first embodiment shown in FIG. 2.

Furthermore, as an eighth modification of the first or second embodiment, as shown in FIG. 27 (showing the eighth modification of the first embodiment), the optical system 40 (the concave mirror 42) may be eliminated, and the bundle of rays of light, which is diffused by the corresponding optical element 32, 2032, may be directly projected to the projection surface 91. Here, it should be noted that even in the seventh modification of the transmission screen member, as shown in FIG. 26, the bundle of rays of light, which is diffused by the corresponding optical element 32, 2032, is directly projected to the projection surface 91.

As a ninth modification of the first or second embodiment, in addition to or in place of the concave mirror 42, any other optical element may be used as the component of the optical system 40.

Figure 28:
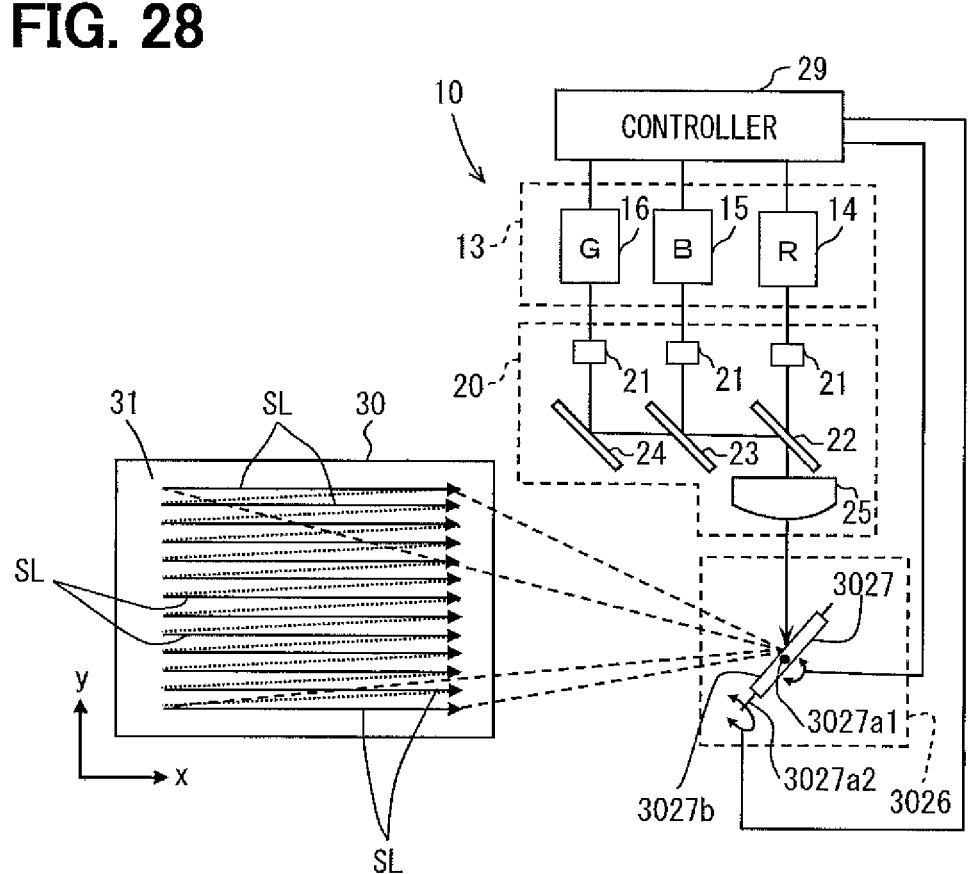
FIG. 28 is a schematic diagram showing another modification of the HUD apparatus of the first embodiment shown in FIG. 4.

Furthermore, as a tenth modification of the first or second embodiment, as indicated in FIG. 28 (showing the tenth modification of the first embodiment), an MEMS device 3026 may be provided in place of the MEMS device 26. The MEMS device 3026 includes a two-axis scanner 3027 that has a reflective surface 3027b, which reflects the laser light projected from the light guiding arrangement 20. The scanner 3027 (more specifically, the reflective surface 3027b) is driven to rotate about a vertical pivot shaft 30271a and a horizontal pivot shaft 3027a2. In the tenth modification, the projecting direction of the laser light, which is outputted from the condenser lens 25 and is reflected by the reflective surface 3027b of the two-axis scanner 3027, is changed in response to the rotation of the scanner 3027 about the two axes of the pivot shafts 30271a, 3027a2 to form the display image 71 on the scanning surface 31.

Furthermore, as an eleventh modification of the first or second embodiment, any other type of projector may be used in place of the laser scanner 10 as long as such a projector can display the display image 71 on the scanning surface 31 of the screen member 30, 2030 through the projection of the bundle of rays of light to the scanning surface 31 of the screen member 30, 2030. For example, a projector, which includes a liquid crystal on silicon (LCOS) or a digital mirror device (DMD) may be used as the projector of the present disclosure.

The LCOS is formed by holding a liquid crystal layer between a silicon substrate and a light transmissive substrate. The liquid crystal layer forms a plurality of arrayed pixels. A circuit, which drives the liquid crystal, and an electrode, which reflects the light, are provided in the silicon substrate. The light of the light source (e.g., light-emitting diodes that are abbreviated as LEDs), which enters the LCOS through the light transmissive substrate, passes through the liquid crystal layer and is reflected by the electrode provided in the silicon substrate, so that the reflected light exits the LCOS. When an image, which later becomes the display image 71, is formed in the liquid crystal layer (pixels of the liquid crystal layer), the projector having such an LCOS can project the light that forms the display image on the imaging surface of the screen member 30, 2030.

The DMD is formed by arraying a large number of micro-mirrors on a substrate. Each of the micro-mirrors forms a corresponding pixel. A tilt angle of each micro-mirror can be changed based on a control signal. The light of the light source (e.g., a visible light source, such as LED or a laser light source), which enters the DMD, is reflected by each micro-mirror. The DMD can project the bundle of rays of light, which forms the display image 71, by controlling the tilt angle of each of the micro-mirrors. Thus, the projector, which has the DMD, can project the light, which forms the display image 71 on the imaging surface of the screen member 30, 2030.

Furthermore, as a twelfth modification of the first or second embodiment, another component, which is other than the windshield 90, may be used to form the projection surface, onto which the display image 71 is projected. For example, the display member may be a combiner (separate member) having a projection surface. This combiner is made of a light transmissive material and is placed adjacent to, more specifically attached to the interior surface of the windshield 90 located inside of the vehicle cabin of the vehicle. Furthermore, the combiner may be formed separately or provided separately from the windshield 90.

Furthermore, as a thirteenth modification of the first or second embodiment, the head-up display apparatus of the present disclosure may be applied to various other types of transportation apparatuses (e.g., other types of vehicles, such as airplanes, ships, trains).

Additional advantages and modifications will readily occur to those skilled in the art. The present disclosure in its broader terms is therefore not limited to the specific details, representative apparatus, and illustrative examples shown and described.

What is claimed is:

1. A head-up display apparatus that is configured to project a display image onto a projection surface of a vehicle and thereby to enable a viewer located in a vehicle cabin of the vehicle to view a virtual image of the display image, the head-up display apparatus comprising:
    a projector that is configured to project a bundle of rays of light, which forms the display image; and
    a screen member that diffuses the bundle of rays of light such that the bundle of rays of light is guided to a viewing range, in which the virtual image is visually recognizable by the viewer in the vehicle cabin, wherein:
    the screen member includes a plurality of optical elements;
    a surface of each of the plurality of optical elements forms a curved surface that diffuses the bundle of rays of light, which enters the curved surface; and
    the plurality of optical elements is arranged continuously one after another in two or more directions at each corresponding pitch that is set to adjust a peak-to-peak interval of diffracted rays, which are formed in the viewing range by diffraction of the bundles of rays diffused by the plurality of optical elements, to a value that is equal to or smaller than 8 mm.

2. The head-up display apparatus according to claim 1, wherein the plurality of optical elements is arranged continuously one after another in the two or more directions at each corresponding pitch that is set to adjust the peak-to-peak interval of the diffracted rays to the value that is equal to or smaller than 2 mm.

3. The head-up display apparatus according to claim 1, wherein:
    the bundles of rays of light are diffused by the plurality of optical elements, respectively, to form a plurality of virtual image points, respectively, which form the virtual image;
    each corresponding pitch of the plurality of optical elements is set to adjust each corresponding pitch of the plurality of virtual image points to a value that is equal to or smaller than a resolution of an eye of the viewer; and
    the resolution of the eye of the viewer is a visual angle of $1/60$ degrees that is set as an angle of a gap of a Landolt ring.

4. The head-up display apparatus according to claim 3, further comprising an optical system, which is placed in an optical path between the screen member and the projection surface formed in a display member of the vehicle, wherein:
    the bundles of rays of light diffused by the plurality of optical elements, respectively, are guided along the optical path;
    the optical system is configured to enlarge the bundles of rays of light, which are diffused by the plurality of optical elements, respectively; and
    each corresponding pitch of the plurality of virtual image points is enlarged by the optical system alone or in cooperation with the display member relative to each corresponding pitch of the plurality of optical elements by a corresponding magnification power that is in a range of 4 to 8 times.

5. The head-up display apparatus according to claim 1, wherein each pitch of the plurality of optical elements is set in a range of 50 to 200 μm.

6. The head-up display apparatus according to claim 1, wherein:
the viewing range, in which the virtual image is visually recognizable by two eyes of the viewer, is configured into a shape of quadrangle that is defined by four outer edges;
two of the four outer edges of the viewing range are generally parallel to each other and are opposed to each other in a first opposing direction of the viewing range, which generally coincides with a left-to-right-direction of the vehicle, and the other two of the four outer edges of the viewing range are generally parallel to each other and are opposed to each other in a second opposing direction of the viewing range, which is perpendicular to the first opposing direction of the viewing range and generally coincides with a top-to-bottom direction of the vehicle; and
the viewing range has a first length in a range of 80 to 200 mm in the first opposing direction of the viewing range and a second length in a range of 30 to 200 mm in the second opposing direction of the viewing range.

7. The head-up display apparatus according to claim 6, wherein:
each of the plurality of optical elements diffuses the bundle of rays of light such that a first angle of diffusion of the bundle of rays of light, which is diffused by the optical element over the viewing range throughout the first length of the viewing range measured in the first opposing direction of the viewing range, is in a range of 10 to 50 degrees, and a second angle of diffusion of the bundle of rays of light, which is diffused by the optical element over the viewing range throughout the second length of the viewing range measured in the second opposing direction of the viewing range, is in a range of 5 to 50 degrees;
each of the plurality of optical elements is configured into a shape of quadrangle, which is generally homothetic to the shape of quadrangle of the viewing range and is defined by four outer edges;
two of the four outer edges of each optical element, which correspond to the two of the four outer edges of the viewing range, are generally parallel to each other and are opposed to each other in a first opposing direction of the optical element, and the other two of the four outer edges of the optical element, which correspond to the other two of the four outer edges of the viewing range, are generally parallel to each other and are opposed to each other in a second opposing direction of the optical element, which is perpendicular to the first opposing direction of the optical element;
a first radius of curvature of an arc of the curved surface of each of the plurality of optical elements, which is arcuately curved in the first opposing direction of the optical element, is in a range of 0.1 to 2 mm; and
a second radius of curvature of an arc of the curved surface of each of the plurality of optical elements, which is arcuately curved in the second opposing direction of the optical element, is in a range of 0.1 to 2 mm.

8. The head-up display apparatus according to claim 1, wherein:

the projector is configured to project a plurality of colors of single-wavelength laser lights, each of which has a corresponding peak wavelength, as the bundle of rays of light; and
a maximum wavelength among the corresponding peak wavelengths of the plurality of colors of single-wavelength laser lights is in a range of 600 to 650 nm.

9. A head-up display apparatus that is configured to project a display image onto a projection surface of a vehicle and thereby to enable a viewer located in a vehicle cabin of the vehicle to view a virtual image of the display image, the head-up display apparatus comprising:
a projector that is configured to project a bundle of rays of light, which forms the display image; and
a screen member that diffuses the bundle of rays of light such that the bundle of rays of light is guided to a viewing range, in which the virtual image is visually recognizable by the viewer in the vehicle cabin, wherein:
the screen member includes a plurality of optical elements;
a surface of each of the plurality of optical elements forms a curved surface that diffuses the bundle of rays of light, which enters the curved surface; and
the plurality of optical elements is arranged continuously one after another in two or more directions at each corresponding pitch that is set to adjust a peak-to-peak interval of diffracted rays, which are formed in the viewing range by diffraction of the bundles of rays diffused by the plurality of optical elements, to a value that is equal to or smaller than a diameter of a pupil of the viewer.

10. The head-up display apparatus according to claim 9, wherein:
the viewing range is configured into a shape of polygon, which is defined by a plurality of outer edges;
each of the plurality of optical elements is configured into a shape of polygon, which is generally homothetic to the shape of polygon of the viewing range and is defined by a plurality of outer edges;
each of the polygon of the viewing range and the polygon of each of the plurality of optical elements is configured such that a total number of the plurality of outer edges of the polygon is defined by 2N where N is an integer number that is equal to or larger than 2, and a total number of a plurality of opposing directions, in each of which corresponding parallel two of the plurality of outer edges of the polygon are opposed to each other, is N; and
the corresponding pitch of the plurality of optical elements in each corresponding one of the plurality of opposing directions satisfies the following equation:

$$Pn \geq \frac{\lambda}{\sin\left(\frac{\varphi p \times \theta sn}{Dn}\right)}$$

where:
Pn denotes the corresponding pitch of the plurality of optical elements;
λ denotes a wavelength of the bundle of rays of light projected from the projector;
φp denotes the diameter of the pupil of the viewer;
Dn denotes a length of the viewing range measured in the corresponding one of the plurality of opposing directions; and θsn denotes an angle of diffusion of the bundle of rays of light, which is diffused by the optical element over the viewing range throughout the length of the viewing range measured in the corresponding one of the plurality of opposing directions.

11. The head-up display apparatus according to claim 10, wherein:
   the projector is configured to project a plurality of colors of single-wavelength laser lights, each of which has a peak wavelength, as the bundle of rays of light; and
   the wavelength of λ is a maximum wavelength among the peak wavelengths of the plurality of colors of single-wavelength laser lights.

12. The head-up display apparatus according to claim 9, wherein:
   the bundles of rays of light are diffused by the plurality of optical elements, respectively, to form a plurality of virtual image points, respectively, which form the virtual image; and
   each corresponding pitch of the plurality of optical elements is set to adjust each corresponding pitch of the plurality of virtual image points to a value that is equal to or smaller than a resolution of an eye of the viewer.

13. The head-up display apparatus according to claim 12, further comprising an optical system, which is placed in an optical path between the screen member and the projection surface of the vehicle, wherein:
   the bundles of rays of light diffused by the plurality of optical elements, respectively, are guided along the optical path;
   the optical system is configured to enlarge the bundles of rays of light, which are diffused by the plurality of optical elements, respectively; and
   each corresponding pitch of the plurality of virtual image points is enlarged by the optical system relative to each corresponding pitch of the plurality of optical elements.

14. The head-up display apparatus according to claim 13, wherein:
   each of the plurality of optical elements is configured into a shape of polygon that is defined by a plurality of outer edges;
   a total number of the plurality of outer edges of the polygon of each optical element is defined by 2N where N is an integer number that is equal to or larger than 2, and a total number of a plurality of opposing directions, in each of which corresponding parallel two of the plurality of outer edges of the polygon are opposed to each other, is N;
   the optical system is placed in the optical path between the screen member and the projection surface formed in a display member of the vehicle; and
   the corresponding pitch of the plurality of optical elements in each corresponding one of the plurality of opposing directions satisfies the following equation:

$$Pn \leq \frac{L}{Mn} \times \tan(Re)$$

where:
   Pn denotes the corresponding pitch of the plurality of optical elements;
   Mn denotes a magnification power of the bundle of diffused rays, which is enlarged by the optical system alone or in cooperation with the display member in the corresponding one of the plurality of opposing directions;
   L denotes a distance from the viewing range to the virtual image; and
   Re denotes the resolution of the eye of the viewer.

15. The head-up display apparatus according to claim 10, wherein:
   the polygon of each of the plurality of optical elements is a square; and
   all of the corresponding pitches of the plurality of optical elements in the plurality of opposing directions, respectively, are generally equal to each other.

16. The head-up display apparatus according to claim 9, wherein a radius of curvature of each corresponding arc of the curved surface of each of the plurality of optical elements is set based on a corresponding angle of diffusion of the bundle of rays of light, which is diffused by the curved surface of the optical element over the viewing range throughout the viewing range.

17. The head-up display apparatus according to claim 16, wherein:
   the viewing range is configured into a shape of polygon that is defined by a plurality of outer edges;
   each of the plurality of optical elements is configured into a shape of polygon that is generally homothetic to the shape of polygon of the viewing range and is defined by a plurality of outer edges;
   each of the polygon of the viewing range and the polygon of each of the plurality of optical elements is configured such that a total number of the plurality of outer edges of the polygon is defined by 2N where N is an integer number that is equal to or larger than 2, and a total number of a plurality of opposing directions, in each of which corresponding parallel two of the plurality of outer edges are opposed to each other, is N; and
   the corresponding radius of curvature of the corresponding arc of the curved surface of each of the plurality of optical elements, which is arcuately curved in the corresponding one of the plurality of opposing directions, satisfies the following equation:

$$Rn = \frac{Pn}{2 \times \sin\left(\frac{\theta sn}{4}\right)}$$

where:
   Rn denotes the corresponding radius of curvature of the arc of the curved surface of each of the plurality of optical elements, which is arcuately curved in the corresponding one of the plurality of opposing directions;
   θsn denotes an angle of diffusion of the bundle of rays of light, which is diffused by the optical element over the viewing range throughout a length of the viewing range measured in the corresponding one of the plurality of opposing directions; and
   Pn denotes the corresponding pitch of the plurality of optical elements in the corresponding one of the plurality of opposing directions.

18. The head-up display apparatus according to claim 9, wherein:
   the viewing range is configured into a shape of quadrangle that is defined by four outer edges;
   two of the four outer edges of the viewing range are generally parallel to each other and are opposed to each other in a first opposing direction of the viewing range, which generally coincides with a left-to-right direction of the vehicle, and the other two of the four outer edges of the viewing range are generally parallel to each other and are opposed to each other in a second opposing direction of the viewing range, which generally coincides with a top-to-bottom direction of the vehicle; and the viewing range has a first length in the first opposing direction of the viewing range, and a second length in the second opposing direction of the viewing range.

19. The head-up display apparatus according to claim 18, wherein the quadrangle of the viewing range is an elongated rectangle, and the first length of the viewing range is larger than the second length of the viewing range.

20. A head-up display apparatus that is configured to project a display image onto a projection surface formed in a display member of a vehicle and thereby to enable a viewer located in a vehicle cabin of the vehicle to view a virtual image of the display image, the head-up display apparatus comprising:

a projector that is configured to project a bundle of rays of light, which forms the display image; and a screen member that diffuses the bundle of rays of light such that the bundle of rays of light is guided to a viewing range, in which the virtual image is visually recognizable by the viewer in the vehicle cabin, wherein:

the viewing range is configured into a shape of quadrangle that is defined by four outer edges;

two of the four outer edges of the viewing range are generally parallel to each other and are opposed to each other in a first opposing direction of the viewing range, which generally coincides with a left-to-right-direction of the vehicle, and the other two of the four outer edges of the viewing range are generally parallel to each other and are opposed to each other in a second opposing direction of the viewing range, which is perpendicular to the first opposing direction of the viewing range and generally coincides with a top-to-bottom direction of the vehicle;

the screen member includes a plurality of optical elements, each of which is configured into a shape of quadrangle that is generally homothetic to the shape of quadrangle of the viewing range and is defined by four outer edges;

two of the four outer edges of each optical element, which correspond to the two of the four outer edges of the viewing range, are generally parallel to each other and are opposed to each other in a first opposing direction of the optical element, and the other two of the four outer edges of the optical element, which correspond to the other two of the four outer edges of the viewing range, are generally parallel to each other and are opposed to each other in a second opposing direction of the optical element, which is perpendicular to the first opposing direction of the optical element;

a surface of each of the plurality of optical elements forms a curved surface that diffuses the bundle of rays of light, which enters the curved surface, toward the viewing range;

the plurality of optical elements is arranged continuously one after another at a first pitch in the first opposing direction of each optical element and a second pitch in the second opposing direction of each optical element;

the first pitch satisfies the following equation:

$$P1 \geq \frac{\lambda}{\sin\left(\frac{\varphi p \times \theta s1}{D1}\right)}$$

where:

P1 denotes the first pitch;

$\lambda$ denotes a wavelength of the bundle of rays of light projected from the projector;

$\varphi p$ denotes a diameter of a pupil of the viewer;

D1 denotes a first length of the viewing range measured in the first opposing direction of the viewing range; and $\theta s1$ denotes a first angle of diffusion of the bundle of rays of light, which is diffused by the optical element over the viewing range throughout the first length of the viewing range measured in the first opposing direction of the viewing range; and the second pitch satisfies the following equation:

$$P2 \geq \frac{\lambda}{\sin\left(\frac{\varphi p \times \theta s2}{D2}\right)}$$

where:

P2 denotes the second pitch;

$\lambda$ denotes the wavelength of the bundle of rays of light projected from the projector;

$\varphi p$ denotes the diameter of the pupil of the viewer;

D2 denotes a second length of the viewing range measured in the second opposing direction of the viewing range; and $\theta s2$ denotes a second angle of diffusion of the bundle of rays of light that is diffused by the optical element over the viewing range throughout the second length of the viewing range measured in the second opposing direction of the viewing range.

21. The head-up display apparatus according to claim 20, further comprising an optical system, which is placed in an optical path between the screen member and the projection surface of the display member, wherein:

the bundles of rays of light diffused by the plurality of optical elements, respectively, are guided along the optical path;

the optical system is configured to enlarge the bundles of rays of light, which are diffused by the plurality of optical elements, respectively;

the first pitch satisfies the following equation:

$$P1 \leq \frac{L}{M1} \times \tan(Re)$$

where:

P1 denotes the first pitch;

M1 denotes a magnification power of the bundle of diffused rays, which is enlarged by the optical system alone or in cooperation with the display member in the first opposing direction of the viewing range;

L denotes a distance from the viewing range to the virtual image; and

Re denotes a resolution of an eye of the viewer; and the second pitch satisfies the following equation:

$$P2 \leq \frac{L}{M2} \times \tan(Re)$$

where:

P2 denotes the second pitch;

M2 denotes a magnification power of the bundle of diffused rays, which is enlarged by the optical system alone or in cooperation with the display member in the second opposing direction of the viewing range;

L denotes the distance from the viewing range to the virtual image; and

Re denotes the resolution of the eye of the viewer.

22. The head-up display apparatus according to claim 20, wherein:

a first radius of curvature of an arc of the curved surface of each of the plurality of optical elements, which is arcuately curved in the first opposing direction, satisfies the following equation:

$$R1 = \frac{P1}{2 \times \sin\left(\frac{\theta s1}{4}\right)}$$

where:

R1 denotes the first radius of curvature;

θs1 denotes the first angle of diffusion; and

P1 denotes the first pitch; and a second radius of curvature of an arc of the curved surface of each of the plurality of optical elements, which is arcuately curved in the second opposing direction, satisfies the following equation:

$$R2 = \frac{P2}{2 \times \sin\left(\frac{\theta s2}{4}\right)}$$

where:

R2 denotes the second radius of curvature;

θs2 denotes the second angle of diffusion; and

P2 denotes the second pitch.

23. The head-up display apparatus according to claim 20, wherein the projector is configured to project a laser light as the bundle of rays of light.

24. The head-up display apparatus according to claim 20, wherein each of the plurality of optical elements is configured to reflect the bundle of rays of light, which is projected from the projector, to diffuse the bundle of rays of light.

25. The head-up display apparatus according to claim 20, wherein each of the plurality of optical elements is configured to transmit the bundle of rays of light, which is projected from the projector, through the optical element to diffuse the bundle of rays of light.

26. A screen member for a head-up display apparatus that is configured to project a display image onto a projection surface of a vehicle and thereby to enable a viewer located in a vehicle cabin of the vehicle to view a virtual image of the display image upon diffusing a bundle of rays of light, which is projected from a projector, by the screen member to guide the bundle of rays of light to a viewing range, in which the virtual image is visually recognizable by the viewer in the vehicle cabin, the screen member comprising:

a plurality of optical elements, wherein:

a surface of each of the plurality of optical elements forms a curved surface that diffuses the bundle of rays of light, which enters the curved surface; and the plurality of optical elements is arranged continuously one after another in two or more directions at each corresponding pitch that is set to adjust a peak-to-peak interval of diffracted rays, which are formed in the viewing range by diffraction of the bundles of rays diffused by the plurality of optical elements, to a value that is equal to or smaller than a diameter of a pupil of the viewer.

27. A manufacturing method of a screen member for a head-up display apparatus that is configured to project a display image onto a projection surface of a vehicle and thereby to enable a viewer located in a vehicle cabin of the vehicle to view a virtual image of the display image upon diffusing a bundle of rays of light, which is projected from a projector, by the screen member to guide the bundle of rays of light to a viewing range, in which the virtual image is visually recognizable by the viewer in the vehicle cabin, the manufacturing method comprising:

determining each corresponding pitch of a plurality of optical elements of the screen member arranged continuously one after another in two or more directions to set a peak-to-peak interval of diffracted rays, which are formed in the viewing range upon occurrence of diffraction of bundles of rays diffused by the plurality of optical elements, to a value that is equal to or smaller than 8 mm; and forming the screen member that has the plurality of optical elements, which are arranged continuously one after another in the two or more directions at each corresponding pitch that is determined in the determining of each corresponding pitch of the plurality of optical elements.

28. The manufacturing method according to claim 27, wherein the determining of each corresponding pitch of the plurality of optical elements includes determining each corresponding pitch of the plurality of optical elements such that each corresponding pitch of the plurality of optical elements satisfies the following equation:

$$Pn \geq \frac{\lambda}{\sin\left(\frac{\varphi p \times \theta sn}{Dn}\right)}$$

wherein:

the viewing range is configured into a shape of polygon, which is defined by a plurality of outer edges;

each of the plurality of optical elements is configured into a shape of polygon, which is generally homothetic to the shape of polygon of the viewing range and is defined by a plurality of outer edges;

each of the polygon of the viewing range and the polygon of each of the plurality of optical elements is configured such that a total number of the plurality of outer edges of the polygon is defined by 2N where N is an integer number that is equal to or larger than 2, and a total number of a plurality of opposing directions, in each of which corresponding parallel two of the plurality of outer edges of the polygon are opposed to each other, is N;

Pn denotes the corresponding pitch of the plurality of optical elements;

λ denotes a wavelength of the bundle of rays of light projected from the projector;

φp denotes the value that is equal to or smaller than 8 mm;

Dn denotes a length of the viewing range measured in the corresponding one of the plurality of opposing directions; and θsn denotes an angle of diffusion of the bundle of rays of light, which is diffused by the optical element over the viewing range throughout the length of the viewing range measured in the corresponding one of the plurality of opposing directions.

29. The manufacturing method according to claim 27, wherein the determining of each corresponding pitch of the plurality of optical elements includes determining each corresponding pitch of the plurality of optical elements such that each corresponding pitch of the plurality of optical elements satisfies the following equation:

$$Pn \leq \frac{L}{Mn} \times \tan(Re)$$

wherein:
each of the plurality of optical elements is configured into a shape of polygon that is defined by a plurality of outer edges;
a total number of the plurality of outer edges of the polygon of each optical element is defined by 2N where N is an integer number that is equal to or larger than 2, and a total number of a plurality of opposing directions, in each of which corresponding parallel two of the plurality of outer edges of the polygon are opposed to each other, is N;
an optical system of the head-up display apparatus is placed in an optical path between the screen member and the projection surface formed in a display member of the vehicle;
Pn denotes the corresponding pitch of the plurality of optical elements;
Mn denotes a magnification power of the bundle of diffused rays, which is enlarged by the optical system alone or in cooperation with the display member in the corresponding one of the plurality of opposing directions;
L denotes a distance from the viewing range to the virtual image; and
Re denotes the value that is equal to or smaller than 8 mm.

30. The manufacturing method according to claim 27, further comprising determining a corresponding radius of curvature of each corresponding arc of a curved surface of each of the plurality of optical elements before the forming of the screen member such that the corresponding radius of curvature of each corresponding arc of the curved surface of each of the plurality of optical elements satisfies:

$$Rn = \frac{Pn}{2 \times \sin\left(\frac{\theta sn}{4}\right)}$$

wherein:
the viewing range is configured into a shape of polygon that is defined by a plurality of outer edges;
each of the plurality of optical elements is configured into a shape of polygon that is generally homothetic to the shape of polygon of the viewing range and is defined by a plurality of outer edges;
each of the polygon of the viewing range and the polygon of each of the plurality of optical elements is configured such that a total number of the plurality of outer edges of the polygon is defined by 2N where N is an integer number that is equal to or larger than 2, and a total number of a plurality of opposing directions, in each of which corresponding parallel two of the plurality of outer edges are opposed to each other, is N;
Rn denotes the corresponding radius of curvature of the arc of the curved surface of each of the plurality of optical elements, which is arcuately curved in the corresponding one of the plurality of opposing directions;
θsn denotes an angle of diffusion of the bundle of rays of light, which is diffused by the optical element over the viewing range throughout a length of the viewing range measured in the corresponding one of the plurality of opposing directions;
Pn denotes the corresponding pitch of the plurality of optical elements in the corresponding one of the plurality of opposing directions; and
the forming of the screen member includes forming the screen member such that the curved surface of each of the plurality of optical elements has the corresponding radius of curvature of each corresponding arc determined in the determining of the corresponding radius of curvature of each corresponding arc.

31. An image projecting method of projecting a display image onto a projection surface of a vehicle to enable a viewer located in a vehicle cabin of the vehicle to view a virtual image of the display image, the image projecting method comprising:
adjusting a peak-to-peak interval of diffracted rays, which are formed in the viewing range, to a value that is equal to or smaller than a diameter of a pupil of the viewer through use of:
a projector that is configured to project a bundle of rays of light, which forms the display image; and
a screen member that diffuses the bundle of rays of light such that the bundle of rays of light is guided to the viewing range, in which the virtual image is visually recognizable by the viewer in the vehicle cabin, wherein:
the screen member includes a plurality of optical elements;
a surface of each of the plurality of optical elements forms a curved surface that diffuses the bundle of rays of light, which enters the curved surface, and the diffracted rays are formed in the viewing range by diffraction of the bundles of rays of light, which are diffused by the plurality of optical elements, respectively; and
the plurality of optical elements is arranged continuously one after another in two or more directions at each corresponding pitch.

* * * * *